United States Patent
Moniz et al.

(10) Patent No.: US 9,558,106 B1
(45) Date of Patent: Jan. 31, 2017

(54) TESTING SERVICE WITH CONTROL TESTING

(71) Applicant: Amazon Technologies, Inc., Reno, NV (US)

(72) Inventors: Samuel Leonard Moniz, Seattle, WA (US); Keian Christopher, Seattle, WA (US); Andrew Ross Evenson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 267 days.

(21) Appl. No.: 14/135,290

(22) Filed: Dec. 19, 2013

(51) Int. Cl.
G06F 9/44 (2006.01)
G06F 9/45 (2006.01)
G06F 11/36 (2006.01)

(52) U.S. Cl.
CPC .............................. *G06F 11/3688* (2013.01)

(58) Field of Classification Search
CPC .. G06Q 10/06; G06Q 10/06398; G06Q 30/02; G06Q 30/0209; G06F 11/3688; G06F 8/445; G06F 8/71
See application file for complete search history.

(56) References Cited

U.S. PATENT DOCUMENTS

| | | | |
|---|---|---|---|
| 6,427,000 B1 * | 7/2002 | Mumford et al. | 379/9 |
| 6,701,514 B1 * | 3/2004 | Haswell et al. | 717/115 |
| 6,981,180 B1 | 12/2005 | Bailey et al. | |
| 7,818,666 B2 * | 10/2010 | Dorsett, Jr. | G06F 17/2247 715/237 |
| 8,001,422 B1 | 8/2011 | Sun et al. | |
| 8,087,001 B2 * | 12/2011 | Hoyek | G06F 11/3688 717/124 |
| 8,112,262 B1 | 2/2012 | Michelsen | |
| 8,117,598 B2 * | 2/2012 | Johnson | G06F 8/71 717/124 |
| 8,161,458 B2 * | 4/2012 | Johnson | G06F 8/71 717/122 |
| 8,201,159 B2 * | 6/2012 | Gschwind | G06F 8/445 717/151 |

(Continued)

OTHER PUBLICATIONS

Garriga et al., Testing-based Process for Service-oriented Applications, 2011, 10 pages.*

(Continued)

*Primary Examiner* — Thuy Dao
(74) *Attorney, Agent, or Firm* — Lee & Hayes, PLLC

(57) ABSTRACT

The techniques described herein provide software testing of a candidate software system. In some examples, a testing service compares at least one candidate response to at least a first control response to obtain one or more candidate test differences. The testing service may compare at least a second control response of the plurality of control responses to at least one of the first control response of the plurality of control responses or a third control response of the plurality of control responses to obtain one or more control test differences. The testing service may then analyze the one or more candidate test differences based on the one or more control test differences to generate an evaluation of whether one or more of the candidate test differences are due to differences between the candidate software system and the control software system that generated the first control response.

20 Claims, 9 Drawing Sheets

(56) References Cited

U.S. PATENT DOCUMENTS

| | | | |
|---|---|---|---|
| 8,261,239 B2* | 9/2012 | McGrath | G06F 11/3672 715/704 |
| 8,826,240 B1* | 9/2014 | Lachwani et al. | 717/126 |
| 8,990,778 B1 | 3/2015 | Allocca et al. | |
| 9,009,669 B2* | 4/2015 | Pletter | G06F 11/3688 717/106 |
| 9,292,822 B2* | 3/2016 | Hankins | G06Q 10/10 |
| 2002/0066077 A1* | 5/2002 | Leung | 717/126 |
| 2002/0116153 A1* | 8/2002 | Wybouw-Cognard | 702/186 |
| 2003/0065975 A1* | 4/2003 | Tuttle | 714/33 |
| 2004/0068713 A1* | 4/2004 | Yannakoyorgos et al. | 717/101 |
| 2005/0216471 A1* | 9/2005 | Yee et al. | 707/10 |
| 2005/0257086 A1 | 11/2005 | Triou et al. | |
| 2006/0026465 A1* | 2/2006 | Kwong et al. | 714/38 |
| 2006/0101476 A1 | 5/2006 | Robert | |
| 2006/0123389 A1* | 6/2006 | Kolawa et al. | 717/101 |
| 2008/0082968 A1* | 4/2008 | Chang et al. | 717/128 |
| 2008/0282112 A1 | 11/2008 | Bailey et al. | |
| 2008/0313616 A1* | 12/2008 | Malcolm | 717/127 |
| 2009/0132999 A1 | 5/2009 | Reyes | |
| 2009/0158266 A1* | 6/2009 | Celli et al. | 717/168 |
| 2010/0325616 A1 | 12/2010 | Singonahalli et al. | |
| 2011/0222407 A1 | 9/2011 | Matsuo et al. | |
| 2011/0246971 A1* | 10/2011 | Chua et al. | 717/135 |
| 2011/0307860 A1* | 12/2011 | Park | G06F 8/30 717/107 |
| 2012/0047492 A1 | 2/2012 | Huang et al. | |
| 2012/0291014 A1 | 11/2012 | Shrinivasan | |
| 2013/0117609 A1 | 5/2013 | Dande et al. | |
| 2014/0026122 A1 | 1/2014 | Markande et al. | |
| 2014/0068567 A1 | 3/2014 | Smith et al. | |
| 2015/0339217 A1* | 11/2015 | Avgerinos | G06F 11/3608 717/132 |
| 2015/0378871 A1* | 12/2015 | Asthana | G06F 8/443 717/122 |

OTHER PUBLICATIONS

Jiang et al., Adaptive Random Test Case Prioritization, Nov. 2009, 12 pages.*

Office Action for U.S. Appl. No. 14/038,583, mailed on Oct. 10, 2014, Samuel Leonard Moniz, "Duplicating Proxy Service", 43 pages.

Office Action for U.S. Appl. No. 14/038,619, mailed on Oct. 14, 2014, Samuel Leonard Moniz, "Duplicating Proxy Service", 43 pages.

Office action for U.S. Appl. No. 14/038,619 mailed on Feb. 10, 2016, Moniz et al., "Duplicating Proxy Service", 63 pages.

Office action for U.S. Appl. No. 14/038,583, mailed on Feb. 11, 2016, Moniz et al., "Duplicating Proxy Service ", 53 pages.

Final Office Action for U.S. Appl. No. 14/038,619, mailed on Mar. 13, 2015, Samuel Leonard Moniz, "Duplicating Proxy Service", 48 pages.

Office Action for U.S. Appl. No. 14/038,583, mailed on Mar. 19, 2015, Samuel Leonard Moniz, "Duplicating Proxy Service", 43 pages.

Office action for U.S. Appl. No. 14/038,583, mailed on Jul. 14, 2016, Moniz et al., "Duplicating Proxy Service", 54 pages.

Office action for U.S. Appl. No. 14/038,619, mailed on Aug. 26, 2015, Moniz et al., "Duplicating Proxy Service", 59 pages.

Office action for U.S. Appl. No. 14/038,583, mailed on Aug. 27, 2015, Moniz et al., "Duplicating Proxy Service", 61 pages.

* cited by examiner

TESTING SERVICE WITH CONTROL TESTING

BACKGROUND

Software architects often engage in a process of improving software after deployment of the software. The improvements may be implemented by modifying a software system or by creating a new software system (e.g., a replacement system), where the modified or new software system is intended to replace or operate beside the deployed (current) software system. Deployment of the modified or the new software system may have an impact on hardware that supports the software system (e.g., require more or less processing power and/or time), may impact outcomes resulting from user interaction (e.g., satisfy, annoy, or frustrate users, etc.), or may have other possible outcomes (e.g., include bugs, etc.). Therefore, it is desirable to perform a comparison test to compare results following execution of the modified or new software system against results following execution of the deployed software system prior to a full deployment of the modified or new software system. However, comparison tests of deployed software systems with modified or new software systems may result in detection of differences that are unimportant or otherwise not meaningful, for example, random differences.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
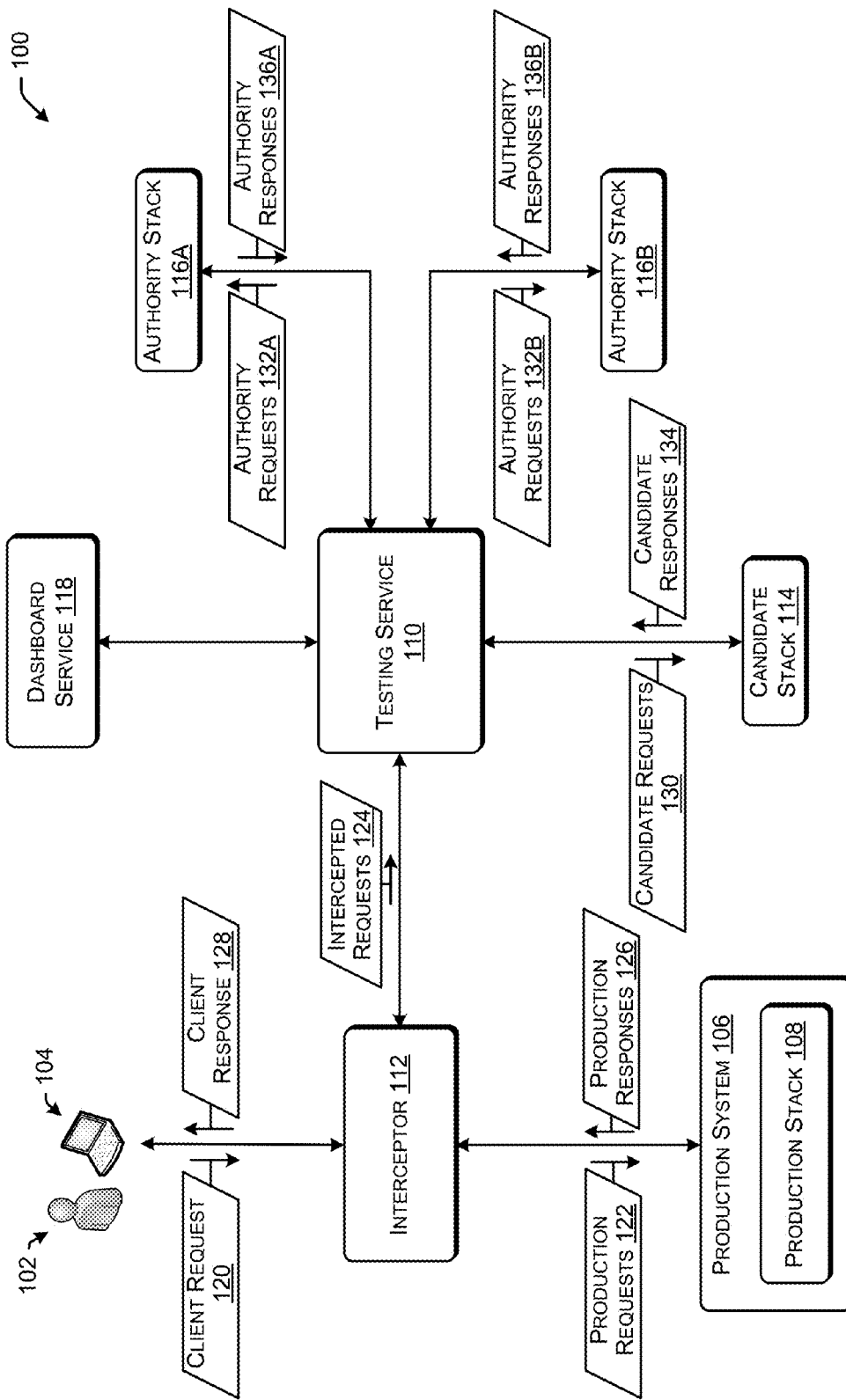
FIG. 1 is a schematic diagram of an illustrative environment that provides software testing of one or more software systems using intercepted requests.

This disclosure is directed in part to software testing that may process a production request using a production (or "live") software system and an intercepted request, which is a duplicate of or is based on the production request. Some implementations may comprise a testing service operating a candidate software system that may be a candidate version of the production software system or a similarly functioning software system. For example, the candidate software system may be a trial or test version, a replacement software system, a new implementation, or so on. In some implementations, the testing service may further operate one or more authority software systems which may be a software system or version of a software system which is used for validating the candidate software system or candidate version of the software system.

The testing service may be part of the production system, a separate system, or part of another system. The production software system may update production system data and may transmit data back to the end users while the intercepted request handled by the candidate software system (and any authority software system(s)) does not output to the users and/or affect the production system. In some implementations, the testing service may operate to compare a response to a candidate request processed by the candidate software system and to a response to a corresponding authority (or production) request processed by the authority (or production) software system. The testing service may also operate to compare the processing of the respective systems in generating the responses. Such a comparison may be referred to herein as a candidate test. In contrast to typical A/B testing, the testing of the candidate software system may occur without updating production system data and thus may be used to test system functionality and performance when executing requests that are based on actual client requests to the production system (i.e., that were or are processed with the production software system).

In some implementations, an interceptor module of a testing service may use sampling rules to intercept client requests and initiate testing based on various factors, rules or logic. Thus, not all client requests may be intercepted, forwarded and/or issued as candidate requests. In some implementations, as each client request is received and processed by the testing service, the testing service system may analyze the result of the candidate software system. For example, the testing service may analyze the result of the candidate software system by performing a candidate test by comparing the result returned for the candidate request to the result returned for the production request by the production software system. The testing service may then derive metrics and log data about the testing on a request-by-request or aggregate basis. Some or all of the data may then be presented via a dashboard service. The dashboard service may be used to replay one or more intercepted requests for various purposes, such as to replay the request to the candidate software system after a code change or patch has been applied.

In some implementations, the testing service may further operate to obtain a plurality of control responses to a production or authority request (also referred to herein as a control request) corresponding to the candidate request. As used herein, a plurality of control responses for a control request may refer to a plurality of responses including any combination of production responses and/or authority responses to the intercepted request. The testing service may then compare the plurality of control responses and the processing of the one or more systems in generating the control responses. Such a comparison may be referred to herein as a control test. The control responses may be generated and the associated processing may be performed by a single stack or by a plurality of stacks. In either case, the control requests may be handled in a sequential manner, a serial manner, a parallel manner or any other suitable manner. In some implementations involving a plurality of stacks, the plurality of stacks may include any combination and/or number of authority and/or production stacks.

In some implementations, the testing service may filter or score differences detected in the candidate test by utilizing information collected in the control test. For example, the testing service may evaluate the differences detected in the candidate test by determining if difference(s) were also detected between the same logical portion(s) of the control responses. As used herein, a logical portion of a response may refer, but is not limited to, a field, a variable, blank portion or other part of the response. For example, in an e-commerce implementation, a logical portion of a response may take the form of a product identifier field, a shipping address field, a payment account number field, or so on.

As mentioned above, in some implementations, when a candidate test is initiated, a plurality of control responses may be obtained for the candidate test and the control test. In implementations that obtain one or more of a plurality of authority responses or a plurality of production responses, the testing service may submit the same intercepted request to a particular authority stack or a particular production stack more than once. In addition or alternatively, the testing service may submit the intercepted request to two or more authority stacks or two or more production stacks. For example, in the illustrated implementations of FIGS. 1-9, the testing service is illustrated and discussed as submitting the intercepted requests to separate authority stacks. This is merely for ease of illustration and is not meant to be viewed as limiting on the disclosed techniques and systems. The processing could be performed by a single authority service processing the authority requests in sequence.

As alluded to above, in some implementations, the testing service may operate to allow for the above described functions to be performed with respect to different software systems, software implementations, and/or different versions. In other words, in some implementations, the candidate software system is not limited to a new version of a production software system. For example, the "candidate software system" of some implementations may be a different implementation of the production software system based on a different framework and/or may include a different interface or the like.

The techniques and systems described herein may be implemented in a number of ways and are not limited to those specifically discussed herein. The implementations provided below with reference to the figures are merely examples.

FIG. 1 is a schematic diagram of an illustrative environment 100 that provides for software testing of one or more candidate software systems using a testing service. As shown in FIG. 1, the illustrative environment 100 includes a user 102 operating a user device 104 and a production system 106 operating a production stack 108, a testing service 110 and an interceptor 112. The testing service 110 includes, interacts with and/or operates a candidate stack 114, an authority stack 116A, an authority stack 116B and a dashboard service 118. While shown as stand-alone items, one of ordinary skill in the art would understand that the candidate stack 114 and authority stacks 116A and 116B may be operated by system resources, such as testing service system resources, production system resources or other system resources. These system resources may be computing devices, distributed or non-distributed computing services, server farm(s) or other types of resources that can execute the various software systems. FIG. 1 also illustrates an exemplary testing service system which, in the implementation shown in FIG. 1, includes the testing service 110, interceptor 112, candidate stack 114, authority stacks 116A and 116B and the dashboard service 118. In some implementations, the testing service system may comprise a test framework. In some such implementations, the test framework may be exposed as a web service for external clients.

In operation, the user 102 (e.g., a downstream consumer or user) may, using a user device 104, transmit a client request 120 for electronic data from the production system 106. However, in some implementations, the client request 120 may be a request generated by another service, the production system 106, or another process, and may not be a human-generated request. The production system 106 may be part of an electronic marketplace, an electronic financial service, a messaging service, a social network, and/or any other service that exchanges electronic data with users. The production system 106 may operate various versions of a software system that are executable in a framework and processed by production system resources. The versions may include the version of the software system utilized by the production stack 108 that is currently deployed to fulfill user requests, such as client request 120.

The interceptor 112 intercepts at least some requests sent to the production system 106, such as the client request 120, and forwards (or publishes) the requests to the production stack 108 as production requests 122. In addition, the interceptor 112 (or another component of the testing service system) may store the intercepted requests 124. The production stack 108 processes the production requests 122 normally using the production software system and replies with production responses 126, for example, responses including electronic data requested by the client request from the production system 106. In the example implementation shown in FIG. 1, the interceptor 112 may act as a relay, receiving the production responses 126 and forwarding the production responses 126 to their respective recipients. For example, the interceptor 112 relays the production response 126 that corresponded to the client request 120 to the user device 104 as a client response 128. While the example implementation shown in FIG. 1 shows the interceptor 112 operating as a relay in the manner discussed above, this is not limiting and has been done for ease of illustration. In other implementations, the production stack 108 could reply directly without the interceptor 112 acting as relay.

In addition to forwarding production requests 122 to the production stack 108, the interceptor 112 may forward the intercepted requests 124 to the testing service 110 for use by the testing service 110 in testing. To handle testing in general, the testing service system may use a protocol for testing with standardized meta-data for requests and responses. For example, regarding the meta-data, the interceptor 112 may extract some basic meta-data about the intercepted request 124, service, and/or realm and store the meta-data for use by the testing service 110 along with or as part of the intercepted request 124. The interceptor 112 may operate so as to allow the requests to be intercepted in an asynchronous, non-blocking manner to minimize the potential for disruption of the production system 106 due to, for example, failures in the testing service system (such as a failure of the interceptor 112). Though not shown in the illustrated implementation, in some implementations, similar interception and meta-data extraction operations may be performed for the production responses 126. For example, the intercepted production responses may be used as control responses. In some such implementations, the interceptor 112 may provide the intercepted requests and intercepted responses to the testing service 110 at the same time.

In some implementations, the interception of requests and/or responses for the testing service 110 may be configurable, such as on a per application programming interface (API) level. Some configurable parameters may include a publishing percentage, a sampling methodology, etc. Further, the interceptor 112 may operate based on multiple sets of interception rules, scenarios, tests, etc. For example, in some implementations, the interceptor 112 may be configured to intercept and forward a first percentage (e.g., 50%) of an indicated first type of client request 120 (e.g., product search, purchase order, etc.) and to intercept and forward a second percentage (e.g., 40%) of an indicated second type of client request 120. Further, the interceptor 112 may be configured to cap the forwarding of intercepted requests. For example, the interceptor 112 may be configured to cap the interception and forwarding of the first type of client request 120 at five (5) client requests 120 per second and the interception and forwarding of the second type of client request 120 at eight (8) client requests 120 per second. In another example, the interceptor 112 may be configured to intercept and forward an indicated percentage of all client requests 120 with a cap of twenty-five (25) requests per second. Moreover, these are merely examples of the configuration of the interceptor 112 and implementations may include any combination of these and/or other configurable parameters.

The testing service 110 processes the intercepted requests 124. Depending on the processing desired, the testing service 110 operates to replay the intercepted requests 124 to one or more of the production stack 108, candidate stack 114, the authority stacks 116A and 116B and or other stacks. This is illustrated in FIG. 1 as the candidate requests 130 and the authority requests 132A and 132B, respectively. Herein, two processing scenarios are set forth as non-limiting examples.

In a first processing scenario, the testing service 110 replays the intercepted request 124 to the candidate stack 114 and to the authority stacks 116A and 116B as a candidate request 130 and authority requests 132A and 132B. The testing service 110 utilizes the resulting candidate response 134 and authority responses 136A and 136B in testing the software system operated by the candidate stack 114.

In a second processing scenario (not shown), the testing service 110 replays the intercepted request 124 to the candidate stack 114 and an authority stack 116. The second control response may be obtained by the interceptor 112 of the testing service 110 by intercepting the production response 126 as an intercepted response. The candidate response 134, an authority response 136 and the intercepted response are then used in testing the candidate software system operated by the candidate stack 114. In another variation of this processing scenario, the authority stacks 116A and 116B may be removed and the production system 106 may be operated to process a control request to obtain a second control response for the processing.

As mentioned above, the candidate stack 114 is a stack operating a candidate software system which is to be validated, such as an altered application stack or software system that is to be validated or a new software system or implementation of the software system being adopted for the production system 106. The authority stacks 116A and 116B are stacks operating software system(s) which may be used for validating the software system operated by the candidate stack 114 in some types of testing. Depending on the details of the implementation, the software systems operated by the authority stacks 116A and 116B may be the same or different.

In some implementations, the authority stacks 116A and 116B may be a most recent version of a software system of the production system 106 known to have acceptable functionality and performance (e.g., an acceptable level of errors, an acceptable processing time for various types of requests, etc.). For example, the software system operated by the authority stacks 116A and 116B may be mirror copies of the software system of the production stack 108 operated by the production system 106. As mentioned above, in some implementations, the production stack 108 may be operated to perform the functions of the authority stack(s) 116A and/or 116B. In such a case, in some implementations, one or more of the authority requests 132A and 132B may be sent to the production system 106 by the testing service 110 and may be tagged such that the production stack 108 knows the authority requests 132A and/or 132B are shadow requests and should be returned to the testing service 110 instead of the user device 104 and that the processing of the authority requests 132A and/or 132B should not result in changes in production system data used to perform production requests 122. Depending on the implementation, the production system 108 may be issued two authority requests 132A and 132B or the production response 126 and information pertaining to the production response 126 may be used in place of one of the authority responses 136A or 136B.

As mentioned above, at a logical level, the testing service 110 may operate to determine (1) differences between the candidate response 134 and an authority response 136A or 136B (i.e. a candidate test) and (2) differences (if any) between the authority responses 136A and 136B (i.e. a control test). Then, the differences found in the candidate test may be filtered, evaluated and/or scored. For example, at a conceptual level, if a control test difference occurs between the authority responses 136A and 136B at a logical location, a difference between the candidate response 134 and the authority response 136 at the same logical location is not likely a meaningful difference (e.g., it may be a serial number or response number that changes between each responses or a random field). On the other hand, a candidate test difference at a logical location where a difference does not appear in the control test is more likely a meaningful difference. As used herein, a meaningful difference may be a difference resulting from a difference between the candidate software system and the production or authority software system or the operation thereof and may be an undesirable difference. For example, in an e-commerce setting, such a meaningful difference may be an incorrect or different tax amount calculated by the candidate software system or some other likely error.

In some implementations, the testing service 110 may operate to dynamically modify at least some of the parameters of the intercepted requests 124 before replaying the requests as shadow requests to the candidate stack 114 and authority stacks 116A and 116B. In such an implementation, the testing service 110 may preserve the integrity of the modified shadow requests, apart from the intended modifications, to faithfully replay the shadow requests.

In operation, the candidate stack 114 and authority stacks 116A and 116B each receive the candidate requests 130 and authority requests 132A and 132B, respectively, from the testing service 110 and process the received requests according to its respective software system. In some implementations, unlike the processing performed by the production system 106 for the production request 120, the processing at the candidate stack 114 and authority stack(s) 116 may not be revealed or reported to the user 102 and/or may not modify data used by the production system 106. Thus, any outputs and/or manipulations of data from the candidate stack 114 and authority stacks 116A and 116B may not be seen by the user 102 and/or used to generate data that is later output to the user 102. Instead, the processing by the candidate stack 114 and authority stacks 116A and 116B is used to test execution of the software system operated by the candidate stack 114. Upon completion of the processing of each of the candidate requests 130 or authority requests 132A and 132B, the candidate stack 114 and authority stacks 116A and 116B send a candidate response 134 or authority responses 136A and 136B to the testing service 110, respectively. While FIG. 1 shows the candidate stack 114 and authority stacks 116A and 116B as operating separately as independent entities, implementations are not so limited. Rather, in various implementations, the operations of the candidate stack 114 and authority stacks 116A and 116B may be performed in parallel, sequentially, or at other times by the same or different computing devices of the testing system or another system.

To perform the candidate test and control test, upon receiving a candidate response 134 and corresponding authority responses 136A and 136B, the testing service 110 may compare the fields contained in the candidate response 134 and the authority responses 136A and 136B along with other information such as latency data or other performance metrics and logs the results. The results of the comparison and the logs are then available for use by the components of the testing service 110 and dashboard service 118, as will be discussed in more detail below with respect to FIGS. 2 and 3.

As mentioned above, in the other processing scenario, one or more intercepted production responses and any meta-data extracted regarding the intercepted production responses may be utilized instead of the authority responses 136A and 136B in a similar manner to that discussed above and below. Except where explicitly noted otherwise, with regard to the remaining discussion, authority responses and production responses being used in the candidate test and/or control test will be discussed as authority or control responses due to the similar treatment of the responses. Still, as would be recognized by one of ordinary skill in the art, the treatment of the authority responses 136 and intercepted production responses may differ in some implementations (e.g., if both are utilized).

Figure 2:
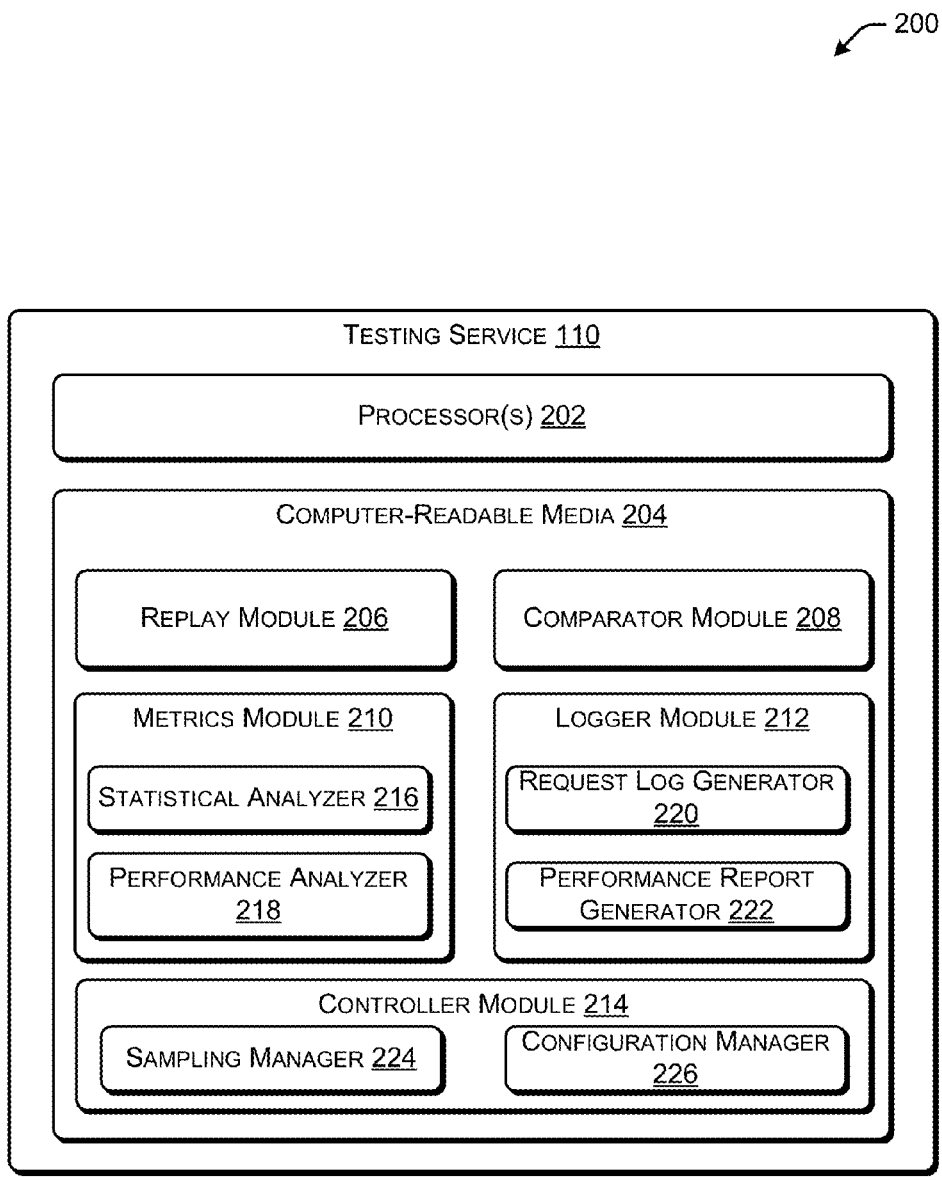
FIG. 2 is a schematic diagram of an illustrative computing architecture to provide a testing service for software testing of one or more software systems using intercepted requests.

FIG. 2 is a schematic diagram of an illustrative computing architecture 200 of an example testing service 110 that provides for software testing of one or more software systems using intercepted requests. The computing architecture 200 may be implemented in a distributed or non-distributed computing environment.

The computing architecture 200 may include one or more processor(s) 202 and computer readable media 204 that store various modules, applications, programs, or other data. The processor(s) 202 may be a single processing unit or a number of processing units, all of which may include single or multiple computing units or multiple cores. The processor(s) 202 can be implemented as one or more hardware processors such as microprocessors, microcomputers, microcontrollers, digital signal processors, central processing units, state machines, logic circuitries, and/or any devices that manipulate signals based on operational instructions. Among other capabilities, the processor 202 can be configured to fetch and execute computer-readable instructions stored in the computer-readable media 204, a mass storage device, or other computer-readable media. The computer-readable media 204 may include instructions that, when executed by the one or more processors 202, cause the processors to perform the operations described herein for the testing service 110. In some embodiments, the computer-readable media 204 may store a replay module 206, a comparator module 208, a metrics module 210 and associated components, a logger module 212 and associated components, and a controller module 214 and associated components, which are described in turn. The components may be stored together or in a distributed arrangement.

The replay module 206 may operate to replay the intercepted requests 124 to the candidate stack 114 and, in a least some cases, the authority stacks 116A and 116B. In the following discussion, it should be understood that the authority stacks 116A and 116B may not be utilized for all operations of the testing service 110 (e.g. in operations in which production responses 130 and/or the results of authority requests to the production system 106 are utilized). Thus, simultaneous discussion of the operations of the candidate stack 114 and authority stack 116 is for convenience and not limitation.

In summary, in some implementations, the replay module 206 operates to impersonate the entity making the request and interacts with the candidate stack 114 and authority stacks 116A and 116B in accordance with this role. In some implementations, the replay module 206 operates to dynamically modify at least some of the parameters of the intercepted requests 124 before replaying the requests to the candidate stack 114 and authority stacks 116A and 116B as the candidate requests 130 and authority requests 132A and 132B. For example, the replay module 206 may modify candidate requests 130 to the candidate stack 114 to simulate specific behavior for test purposes. In such an implementation, the replay module 206 may preserve the integrity of the modified candidate request, apart from the intended modifications, to faithfully replay the candidate request 130.

As mentioned above, in some implementations, the candidate stack 114 may operate a candidate software system which is a different implementation of the software system operated by the production stack 106 or the authority stacks 116 (e.g., an implementation utilizing a different framework or interface to similar core logic). The candidate stack 114 may also operate a candidate software system which is an entirely different software system to that operated by the production stack 106 or the authority stacks 116. In these and similar scenarios, the replay module 206 may operate to modify the intercepted requests 124 to match a specification of the candidate software system operated by candidate stack 114.

Upon receiving the candidate response 134 and authority responses 136A and 136B corresponding to a particular intercepted request 124, the replay module 206 may extract meta-data for the responses and publish the responses and meta-data to the comparator module 208. Some examples of meta-data that may be extracted include information that may be used to derive latency data or other performance metrics.

The comparator module 208 may receive the candidate response 134 and authority responses 136A and 136B and, with regard to each candidate/authority response set, perform a candidate test between the candidate response 134 and one or more of the authority responses 136A and 136B and a control test between the authority responses 136A and 136B. In some implementations, the comparator module 208 tags and/or classifies at least some of the differences that are ascertained between the responses. For example, the comparator 208 may tag or classify candidate test differences which are specified to be important or unacceptable to the functioning of the software system. As discussed above, at least a part the determination of and/or classification of candidate test differences may be performed by determining if similarly located differences are found in the control test.

In some implementations, extensible modeling language based definitions may be used to define the comparison and replay by the testing service 110 based on a standardized format. Using such definitions, the comparator module 208 may allow differences based on planned functionality changes in the candidate stack 114 to be suppressed (e.g. ignored). In some implementations, such suppression of differences based on planned functionality changes in the candidate stack 114 may be implemented at a variety of levels and/or other modules rather than by the comparator module 208. The results of the comparison module 208 are provided to the metrics module 210 and the logger module 212.

It should be noted that the differences determined in the candidate test and control test are not limited to any particular type of differences. For example, the differences that are tagged may also include processing differences. An example of a processing difference is a difference in the processing of the request which may not change the result of the request or result in a latency difference in the response but which causes non-critical error messages or issues unnecessary or superfluous internal requests and may represent an additional processing burden on another system or process. A large number of such processing differences may cause other services or systems to become overwhelmed without an apparent difference in the timing or content of the response to the request.

In some implementations, the comparator module 208 may utilize the results of the control test with respect to such processing differences to determine whether or not the processing differences detected in the candidate test are likely due to the differences between the software systems of the stacks 114 and 116A and/or 116B. For example, if a latency difference detected in the candidate test is similar to the latency difference detected in the control test, the latency difference of the candidate test, even if significant, is less likely to be due to differences between the candidate software system and authority software system. In some implementations, the comparator module 208 may not perform the evaluations of the results of the comparisons. Rather, the comparisons may be evaluated by other modules, such as the metrics module 210 or a different module or combination of modules.

In some implementations, the comparator 208 may, or may be configurable to, omit and/or filter some of the results that the comparator 208 provides to the metrics module 210. For example, the comparator 208 may omit and/or filter the results based on whether the differences are determined to likely be the result of differences between the candidate software system and the authority software system. In some implementations, such filtering and/or omitting may also be performed by selectively suppressing such differences in the results such that some differences for a candidate response will be reported while other differences will be suppressed.

The metrics module 210 may generate metrics from the results of the processing by the candidate stack 114 and the authority stacks 116 that were provided by the comparator module 208. In some implementations, the statistical analyzer 216 may determine a trend in the number of differences identified by the comparator module 208 to be likely or unlikely to be due to differences in the candidate software system and authority software system, the number of differences identified by the comparator module 208 to be unacceptable, determine the number of unacceptable differences identified, capture the trend and/or cause an alarm to be sent to the dashboard service 118, and so on. The statistical analyzer 216 may determine positive or negative trends for the candidate software system operated by the candidate stack 114. For example, the statistical analyzer 216 may determine that a particular client request is indicative of or correlated with a particular outcome (either good or bad). The statistical analyzer 216 may then indicate or record the trend to enable the dashboard service 118 to report the trend and allow for appropriate action to be taken, if necessary. The statistical analyzer 216 may also use confidence levels when determining the trends. The performance analyzer 218 may determine or measure performance trends based on performance of each of the candidate stack 114 and the authority stack(s) 116. The performance analyzer 218 may determine how the system resources are responding to use of the different versions or software systems, include processing of spikes in activity, response time, memory allocation, throughput, bandwidth, or other system performance measurement attributes. The system performance may be analyzed using business metrics, system level metrics (e.g., memory usage, processor usage, etc.), and/or application level metrics (e.g., bugs, errors, diff count, etc.). For example, the performance analyzer 218 may provide statistics on latency differences between the candidate software system of the candidate stack 114 and the authority software system of the authority stack(s) 116. The metrics module 210 or the comparator module 208 may also determine when a candidate software system operated by the candidate stack 114 includes a bug or other error. Further, in some embodiments, the results of the metrics module 210 and/or the comparator module 208 may be used to identify a failing service in a cascading sequence of service calls where the failing service is a downstream service that is causing differences in one or more upstream services. The results of the statistical analyzer 216 and performance analyzer 218 may be output at least to the logger module 212. As with the comparator 208, the operations of the metrics module 210 may take into account whether differences between the candidate stack response and/or processing and the authority stack response(s) and/or processing are determined to be likely due to the differences in respective software systems. Such operations may be configurable to allow for adjustable inclusion or reporting thresholds based on the determined likelihood that a candidate test difference is due to differences between the software systems. In some implementations, different classifications of candidate test differences may be treated differently based on the determined likelihood that the candidate test differences are due to differences in the software systems.

The logger module 212 shown in FIG. 2 may comprise at least two components, a request log generator 220 and a performance report generator 222. The request log generator 220 logs data related to the intercepted requests 124, candidate requests 130 and authority requests 132 which have been processed by the production stack 108, candidate stack 114, authority stack(s) 116, replay module 206, comparator module 208 and/or metrics module 210. The request log generator 220 may log all data relating the intercepted requests 124 or some appropriate subset, depending on the particular implementation and configuration settings. In some implementations, the request log generator 220 may store the requests, responses and differences. For example, the request log generator 220 may store the requests, responses and differences in distributed computing-based storage, with indexed fields for searching. The performance report generator 222 may generate a performance report, which may be based at least in part on an output of the performance analyzer 218.

As mentioned above, many operations of the replay module 206, the comparator module 208, the metrics module 210 and the logger module 212, as well as the interceptor 112, are configurable. In the implementation shown in FIG. 2, the configuration settings are controlled at least in part by a controller module 214. In particular, a sampling manager 224 of the controller module 214 controls aspects of the interceptor 112 and the testing service 110 relating to determining which of the client requests 120 are to be intercepted and forwarded as the intercepted requests 124, which of the intercepted requests 124 are actually processed by the testing service 110 as described above, and so on. The sampling manager 224 consults the configuration manager 226 which interacts with the various systems and users (such as the dashboard service 118) to obtain the configuration settings for the testing service 110. Each of the interceptor 112, replay module 206, comparator module 208, metrics module 210, and logger module 212 may consult the configuration manager 226 to obtain configuration information or the configuration manager 226 may directly configure the other modules. One example operation performed by the sampling manager 224 may be to receive a predetermined confidence level and then calculate the number of samples (intercepted requests) necessary to achieve the predetermined confidence level. Such a confidence level may be determined based on various factors such as a number of unacceptable differences per a number of intercepted requests, a requirement that some measurement of code paths have been exercised or a mix of use cases to be covered during the testing. In addition to the configurability discussed above, the testing service system of some implementations may allow for pluggable modules based on a standardized interface. Such implementations may allow for custom modules which adhere to the standardized interface to be plugged into the testing service system in place of the default modules (e.g., a custom comparator module 208 and custom metrics module 210 in place of the default modules).

Figure 3:
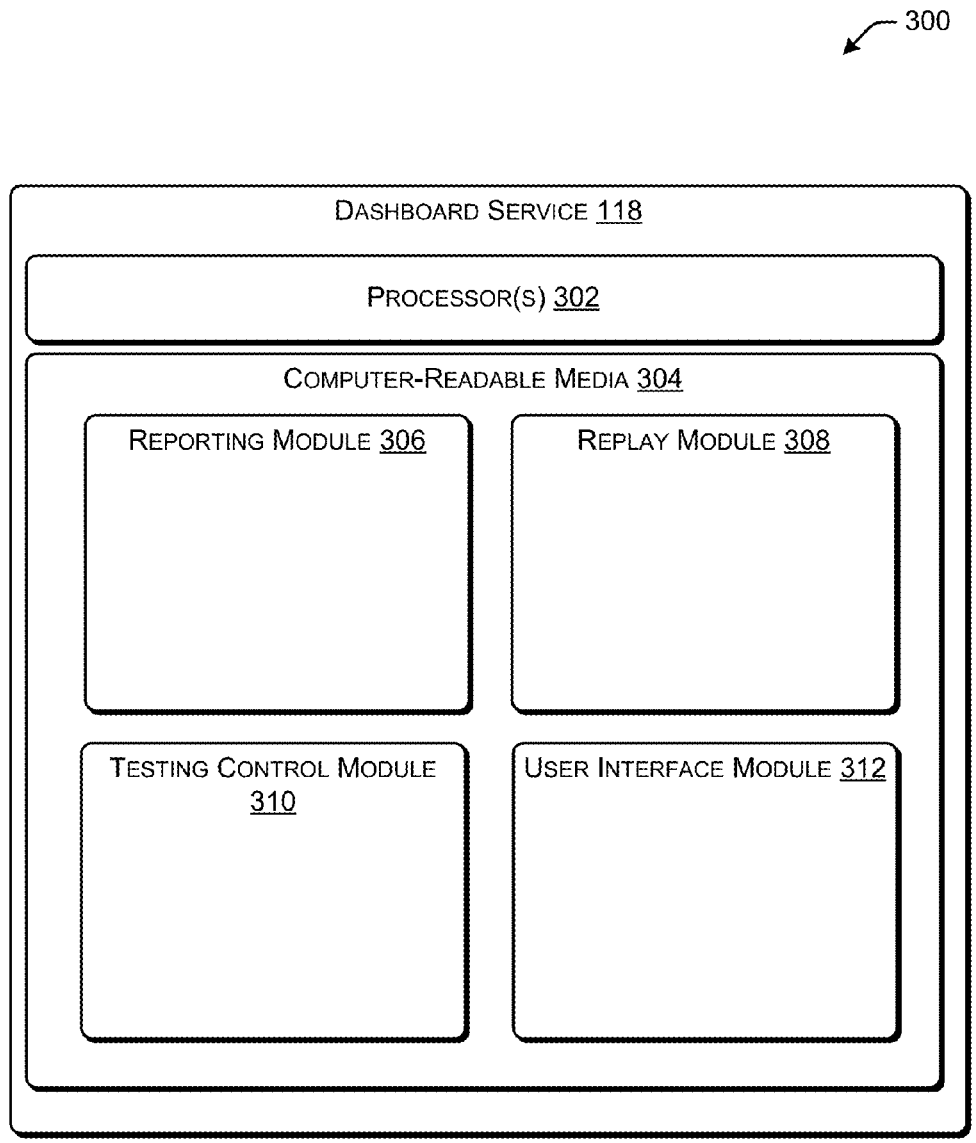
FIG. 3 is a schematic diagram of an illustrative computing architecture to provide a dashboard service for software testing of one or more software systems using intercepted requests.

FIG. 3 is a schematic diagram of an illustrative computing architecture 300 of an example dashboard service 118 that provides interaction with and/or control of the testing service 110. The computing architecture 300 may be implemented in a distributed or non-distributed computing environment.

Similar to the computing architecture 200, the computing architecture 300 may include one or more processors 302 and computer readable media 304 that stores various modules, applications, programs, or other data. The computer-readable media 304 may include instructions that, when executed by the one or more processors 302, cause the processors to perform the operations described herein for the dashboard service 118. In some embodiments, the computer-readable media 304 may store a reporting module 306, a replay module 308, a testing control module 310 and a user interface module 312, which are described in turn. The components may be stored together or in a distributed arrangement.

As mentioned above, the dashboard service 118 provides for interaction with and/or control of the testing service 110. In some implementations, the dashboard service 118 provides the interaction and/or control, in at least two regards. First, the dashboard service 118 collects and parses the results logged by the logger module 212, providing users of the dashboard service 118 with this information. Second, the dashboard service 118 interacts with the controller module 214 to configure the testing service 110, configure the interceptor 112 and/or to setup and request replay of one or more intercepted requests 124. For example, the dashboard service 118 may setup and request the replay of a set of the intercepted requests 124 represented in the logs generated by the request log generator 220 or the intercepted requests 124 as received from the interceptor 112. To select the one or more logged or stored intercepted requests 124 to be replayed, the dashboard service 118 may provide search and display capability for stored requests and differences.

For example, subsequent to a change in the candidate stack 114, the dashboard service 118 may request that the testing service 110 replay the intercepted requests 124 that resulted in meaningful unacceptable differences between the candidate responses 134 and authority response(s) 136 to a new/altered/different candidate stack 114 and, in some implementations, to the authority stack(s) 116 as well. Once the intercepted requests 124 have been replayed, either the testing service 110 or the dashboard service 118 may make a comparison between the new responses and the original responses to determine if the unacceptable differences have been resolved. The general purpose of modules 306-312 in the example implementation shown in FIG. 3 is discussed below, followed by a discussion of the example operations performed by, or caused to be performed by, these modules.

The reporting module 306 may operate to collect or receive the data generated by the logger module 212 and any other data, and prepare the data for presentation to a user via the user interface module 312. For example, the reporting module 306 may collect the trend data generated by the metrics module 210 and prepare this data for presentation in a graph.

In some implementations in which candidate test differences that are determined to likely not be meaningful are tagged but not omitted by the components of the testing service 110, the dashboard service 118 may provide for a variety of user interface controls to allow a dashboard service user to adjust the inclusion or omission of candidate test differences in reports or presentations generated by the reporting module 306. In some implementations, the presentation or formatting of the candidate test differences presented to the user may provide a visual distinction between the likely meaningful differences and likely not meaningful differences. Further, the presentation may have a combination of these features. More particularly, an adjustable threshold or other factor may be set for inclusion of likely not meaningful differences and a formatting or other visual distinction may be provided for those differences included based on the likelihood of the particular differences being meaningful. In a more concrete example, in an output report showing differences on a line by line basis, candidate test differences that are likely meaningful may be presented with black text highlighted in yellow and candidate test differences that are likely not meaningful may be presented as grey text without highlighting. Of course, these are merely examples of the utilization of the likelihood of candidate test differences being meaningful and many variations are possible.

The replay module 308 may operate in the manner discussed above to cause one or more of the logged intercepted requests 124 to be replayed. In some implementations, this is performed by requesting that the testing service 110 replay the intercepted requests 124, possibly with any desired changes in the setup. Though not illustrated in the figures, in some implementations, the replay module 308 may include a copy of the candidate stack 114, the authority stack(s) 116, and/or a new/altered/different candidate stack or the replay module 308 may interact directly with the software system of one or more of these stacks or the production stack 108. In such an implementation, the replay module 308 may replay the intercepted requests 124 directly to the appropriate software system and/or make the appropriate analysis of the results. As discussed above, one example reason for replaying the intercepted requests 124 may be to determine if a changed candidate software system has reduced, eliminated, or exacerbated any unacceptable meaningful differences between the candidate response 134 and authority response(s) 136. The results of the replay of the intercepted requests 124 would be passed, for example, to the reporting module 306 for preparation for presentation to the user via user interface module 312 (possibly after being analyzed by the comparator module 208, the metrics module 210, the logger module 212, and/or other similar modules). In the case of such a replay, a new control test may be performed or, if present, the logged information regarding the initial control test may be utilized for the replay results.

As mentioned above, the testing control module 310 may operate to allow for configuration and/or control of the testing service 110 by, for example, a user of the dashboard service 118 interacting with the dashboard service 118 through the user interface module 312. An example control that may be performed by the control module 310 would be to configure comparator module 208 to tag differences in specific fields for audit and display purposes rather than all fields. Another example control that may be performed by the control module 310 would be to configure the intercept parameters of the interceptor 112 (e.g., the percentage of client requests to intercept, the maximum number of client requests to be intercepted in a given time period, types of client requests to intercept, etc.) Another example control that the control module 310 may provide to a user of the dashboard service 118 would be to provide an interface for configuring the candidate testing and control testing and the behavior of the various modules of the testing service 110 that result from different scenarios of such testing. For example, as discussed above, the testing service 110 may be configured to omit, filter, suppress or otherwise distinguish candidate test differences that, based at least in part on comparison with the control test results, do not appear to be caused by differences between the candidate and authority software systems. In some implementations, the control module 310 may be utilized to set thresholds, categorical treatments and/or other factors for determining what type of treatment a determined difference is to be given (e.g. omitted, included, partially included, visually set off, etc.) As indicated above, the user interface module 312 of the dashboard service 118 may present a user interface to dashboard service users to allow for interaction by the dashboard user with the testing service system.

The dashboard service 118 discussed above may be used to control the testing service 110 in various ways such as those discussed below.

As alluded to previously, through interaction with the dashboard service 118, a dashboard user is able to configure the duration of the testing, such as by configuring conditions upon which the interceptor 112 stops intercepting requests to the production system 106. Some types of conditions are described below.

One example condition for controlling the duration of the testing is a specified mix of use cases represented by the intercepted requests 124, such as a number m of first use case requests, a number n of second use case requests, and so on. Use cases of particular intercepted requests 124 could be determined by the tagging and/or classifying function of the comparator module 208 discussed above. In addition to using the mix of use cases to drive the duration of the testing, the dashboard service 118 could use the determined use cases to provide information on the distribution of use cases to the dashboard users via the reporting module 306 and user interface module 312. In some implementations, the use case reporting may be updated on a real-time basis as intercepted requests 124 are received by the testing service 110 and processed. Such use case information could be presented in a textual manner or in a visualization (such as a chart) for ease of comprehension. The determination of use cases and subsequent presentation of the distribution of the use cases represented by the intercepted requests 124 that have been processed may also be performed without the use of this information to control the duration of the testing.

Another example condition for controlling the duration of the testing is a measure of code coverage. For example, the testing service system could be configured to continue the testing until a defined percentage or other measurement of the code of the candidate stack 114 has been tested to a satisfactory degree. One example implementation to determine code coverage of an intercepted request would be to instrument code of the candidate stack 114 to be tested such that when a portion of the code is executed, it outputs an indication of its execution. Such instrumenting could be coded into the source code of the candidate software system but selectively compiled based on a flag during the compilation process. Thus, when a candidate software system is to be generated by the compiler for testing, the flag would be set and the code coverage instrumentation code would be compiled into the candidate software system. When the candidate software system is to be used as a production software system, the flag would not be set and the compiler would ignore the code coverage instrumentation code.

Further, the testing service system described herein may also be integrated with a source code control system of the software system being tested to allow for identification of code changes that resulted in deviance from expected results and/or to identify the code paths which map to the differences in responses between the candidate stack 114 and the authority stacks 116. For example, for a meaningful difference that occurs between a candidate software system and an authority software system that are versions of the same software system, a developer may be provided with information related to changes in the source code of the software system between the candidate software system and the authority software system and that are also associated with the generation of the logical location of the difference, if applicable.

Integration with the source code control system may also allow the testing service system to include an automatic source code rollback function for the candidate software system of the candidate stack 114. For example, based on threshold of meaningful unacceptable differences, latency increases or the like, the dashboard service 118, either through program logic or explicit user instruction, could instruct the source code control system to rollback changes to the source code of the candidate software system being tested. In addition to using the code coverage to drive the duration of the testing, the dashboard service 118 could use the determined code coverage to provide information on the code coverage to dashboard users via the reporting module 306 and the user interface module 312. As with the use case reporting, in some implementations, the code coverage reporting may be updated on a real-time basis as intercepted requests 124 are received by the testing service 110 and processed. Such code coverage information could be presented in a textual manner or in a visualization (such as a chart or graph) for ease of comprehension. Of course, the determination of code coverage and subsequent presentation thereof may be performed without the use of this information to control the duration of the testing.

In addition, the dashboard service 118 may provide a dashboard user with a user interface (e.g. via the user interface module 312) to cause the testing control module 310 to configure the testing service 110, the candidate stack 114 and the authority stacks 116 for a given test. For example, prior to executing a given test, the user may be able to configure the software systems, software system versions, end points, fleets, and the like to be used for the candidate stack 114 and/or authority stack(s) 116.

In a first particular example, the dashboard user may utilize the dashboard service 118 to select system resources to operate one or more of the candidate stack 114, the authority stack(s) 116, the interceptor 112 or other aspects of the system (e.g., one or more machines of a fleet of machines, one or more distributed computing resources available for provisioning, etc.). The dashboard user may then utilize the dashboard service 118 to select the software systems, software versions, end points, fleets, and the like to be used for the candidate stack 114 and/or authority stack(s) 116. Once system resources are selected and system parameters are input, the dashboard user may cause the dashboard service 118 to control the startup of the candidate stack 114, the authority stack(s) 116 and/or other aspects of the testing service 110 based on the parameters selected by the dashboard user. In an example startup of the candidate stack 114, the user may select one or more machines included in available system resources, choose a particular candidate software system and cause the selected machines to be provisioned with the candidate software system (i.e., install the candidate software system on the machines and perform any other setup process(es) needed to provision the selected machines).

In a second particular example, the dashboard user may utilize the dashboard service 118 in the same manner to select the parameters for the testing service 110 except that the user may select system resources already provisioned with the software systems and the like to be utilized. In such a case, the user may be provided with user interface controls to select any endpoint that matches the parameters of the software systems indicated.

While the above discussion includes particular examples of controls that may be provided to the dashboard user by the dashboard service 118, implementations are not so limited and such details may vary from implementation to implementation. For example, in some implementations, the user may be provided with a combination of the particular examples of selecting parameters for the testing service 110. In a particular example, some implementations of the dashboard service 118 may provide functionality to select either or both pre-provisioned and unprovisioned system resources for utilization by the testing service 110. These and other variations would be apparent to one of ordinary skill in the art in view of this disclosure.

Figure 4:
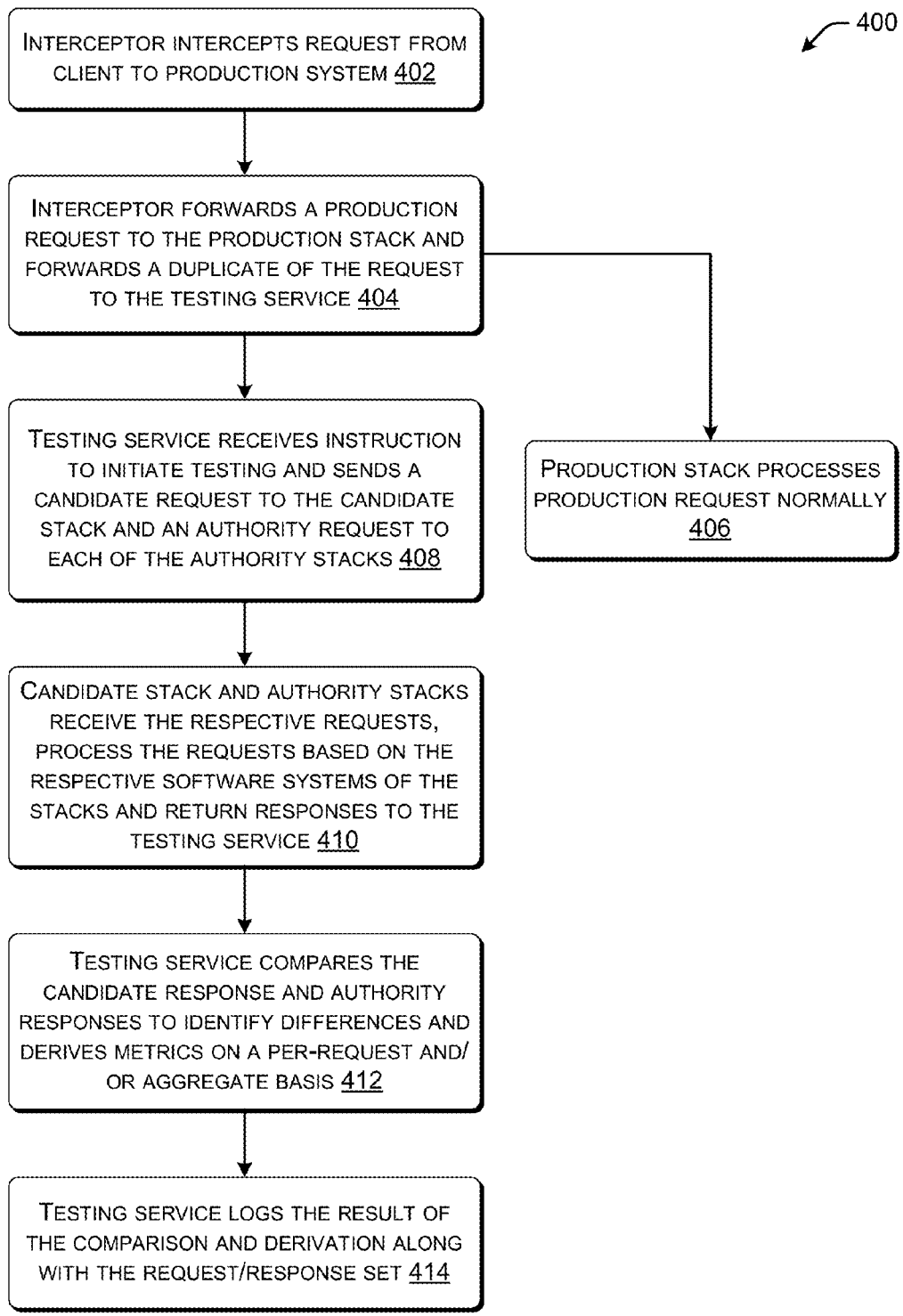
FIG. 4 is a flow diagram of an illustrative process to perform testing of an intercepted request to validate one or more software systems.

FIG. 4 is a flow diagram of an illustrative process 400 that provides for software testing of one or more software systems using intercepted requests as described above regarding FIGS. 1-3. Process 400 may be performed by the testing service 110 in conjunction with the production stack 108, candidate stack 110, authority stacks 116A and 116B and the dashboard service 118. The process 400 (and other processes described herein) may be performed in other similar and/or different devices and/or in different environments. The process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media (e.g., machine readable storage media) that, when executed by one or more hardware processors, perform the recited operations. Generally, computer-executable instructions include routines, programs, objects, components, data structures, and the like that perform particular functions or implement particular abstract data types. Embodiments may be provided as a computer program product including a non-transitory computer-readable storage medium having stored thereon instructions (in compressed or uncompressed form) that may be used to program a computer (or other electronic device) to perform processes or methods described herein. The computer-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/computer-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by Internet download. As used herein, computer-readable storage media and machine readable storage media do not include transitory machine-readable signals or other transitory media. The order in which the operations are described is not intended to be construed as a limitation, and any number of the described blocks can be combined in any order and/or in parallel to implement the process. Other processes described throughout this disclosure (e.g. those illustrated in FIGS. 5, 7 and 8), in addition to process 400, shall be interpreted accordingly.

At 402, the interceptor 112 intercepts a client request 120 from the user 102 to the production system 106. At 404, the interceptor 112 forwards a production request 122 to the production stack 108 and forwards a duplicate of the request to the testing service 110 as an intercepted request 124. At 406, the production stack 108 processes the production request 122 normally such that a production response 126 is sent back to the user device 104 as a client response 128. In the implementation illustrated in FIG. 4, the interceptor 112 may optionally intercept and forward the production response to the testing service 110 as an intercepted response.

At 408, the testing service 110 receives an instruction to initiate testing and, based on the instruction, sends at least some of the intercepted requests 124 to the candidate stack 114 and authority stacks 116A and 116B for processing as the candidate requests 130 and authority requests 132A and 132B.

At 410, the candidate stack 114 and authority stacks 116A and 116B receive the candidate requests 130 and authority requests 132A and 132B, respectively. Then, the candidate stack 114 and authority stacks 116A and 116B process the requests based on their respective software systems and return the candidate responses 134 and authority responses 136A and 136B to the testing service 110, respectively. As stated above regarding FIG. 1, in some implementations, the functions of the authority stacks 116A and 116B may be fulfilled by the production system 106 and, more particularly, the software system operated by the production stack 108. Also, in some implementations, the candidate stack 114 and authority stacks 116A and 116B may need to interact with devices outside of the testing service system, such as the production stack 108 or other production systems, in order to process the candidate requests 130 and authority requests 132A and 132B. In such cases, the interactions with the outside devices may be marked as testing interactions to prevent the outside devices operating on the testing interactions as if the testing interactions were production interactions that modify the production system state and/or data. For example, in the case of "stateful" transactions, some implementations may support storing stateful data (e.g., transaction data), as "candidate transaction data" which will be ignored by production systems. The candidate transaction data may be written by the candidate stack 114, and the testing service 110 loads the candidate transaction data and compares it to "production transaction data" or "authority transaction data" after processing each intercepted request 124. Depending on the details of the implementation, "authority transaction data" may also be marked in a similar manner to "candidate transaction data."

Other implementations may provide support for stateless testing for transaction-based (i.e., stateful) services. For example, such implementations may provide hooks in the software system of the candidate stack 114 to avoid the side effect of storing data in a persistent data store. This may allow requests to be sent to the candidate stack without resulting in storage of transactional data. Additionally or alternatively, some implementations may provide for testing of stateful services using stubbing to avoid side effects and to test communications by candidate software systems with services the candidate software systems depend upon. An example of using stubbing in this manner is discussed more fully with regard to FIG. 9.

At 412, the testing service 110 performs a candidate test and a control test using the candidate response 134 and authority responses 136A and/or 132B. Based on the results of the candidate test and the control test, the testing service 110 may determine or evaluate the candidate test difference for "meaningfulness." Such a meaningfulness evaluation may provide the evaluation as a value on a scale (0-100), a true or false value scale or another manner of representing the result. The testing service 110 also analyzes the responses and, based on one or more candidate/authority and authority/authority response pairs, may derive metrics for the stacks on both a request by request basis and an aggregate basis.

At 414, the testing service 110 may log the results of the comparison and derivation analysis with the requests and responses (as well as any other data regarding the processing to this point, depending on the implementation). The testing service 110 may store the logged information in a variety of ways.

In some implementations, the logged intercepted requests and associated information may be stored in a searchable catalog organized in a hierarchical manner. For example, the following might be paths in the hierarchy:

NA→US→Company the retailer→digital items→address is in New York

NA→US→Company the retailer→movies→address is in California

NA→US→third party sellers→books→address is in Michigan

NA→CA→third party sellers→books→address is in Ontario

EU→UK→Company the retailer→music items→address is in London

EU→DE→Company the retailer→music items→address is in Berlin

For each node in the hierarchy, the testing service 110 may provide support to replay all or a subset of the intercepted requests under that node.

In some implementations, the stored logs provide support for an additional type of testing not explicitly mentioned above. In particular, using the stored logs including stored requests and responses, the testing service 110 may also provide support for regression testing. In other words, the testing service 110 may be capable of running a full regression suite from a node in the request/response catalog against a candidate software system by replaying the stored requests and comparing the candidate responses against the stored responses (e.g. production or authority responses). This way, a new candidate software system may be thoroughly regression tested using a large number of "realistic" production requests (as much as hundreds of thousands, millions or more). Such testing is based on the principle that the behavior in production (or the behavior of an authority version) may be presumed to be correct and therefore the stored responses can be used to qualify new candidate software systems, for example, prior to the testing described above with respect to FIGS. 1-4.

Another storage option is to create an index where each intercepted request is labeled with a unique ID. Such an index may resemble the following:

Company SOR ID: request_01, request_02, . . .

E-Book Item: request_04, request_02, . . .

US Order International ship address: request_04

This second option allows for a single request to be mapped to multiple scenarios. To express the hierarchical paths in such an index, the testing service 110 could use set intersection. The generation of the request repository and generation of the meta-data index may be automated and regenerated from production requests. In some implementations, the repository generation process may continue until a specified index is "complete," meaning each entry in the index maps to at least one request or even that specific combinations of indexes exist, e.g. Non-Company SOR AND E-book. Such an index may provide for very specific use cases to be regression tested with limited numbers of other use cases being exercised. By utilizing this or another indexing scheme, some implementations may provide indexing based on the code coverage or use cases represented by the indexed requests. Thus, in some implementations, rather than testing one hundred thousand to ten million requests and relying on the assumption that the large number of previously tested requests provide the coverage needed, a smaller number of requests may be tested with a higher degree of certainty that the coverage is provided. Further, when a regression test fails, a user may immediately know what use case or code path failed.

In such a system, the use case information or code coverage information may be used to create a test case repository of test cases that map to sets of logged requests. Such test cases may be generated to be small sets of requests that exercise desired levels of code coverage (e.g., the smallest set of requests that give the desired code coverage). For example, in building a test case for a code coverage instrumented candidate stack, as each new request that may be added to the test case is processed, the testing service may determine if code not previously exercised by the test case request set is exercised by the new request. If so, the new request may be added to the test case request set. If not, the new request may not be added to the test case request set. In this way, the overall code coverage of the test case may be increased without substantial increase in the number of requests in the test case set. Depending on the implementation and the purpose of the test case, many variations are possible. For example, the determination as to whether a new request should be added to the test case may be based on how many requests in the test case set already exercise the code exercised by the new request. For example, for some code, the test case developer may desire multiple requests be processed. At the same time, for other code, the developer may desire two requests be added for the purpose of exercising the code.

In another variation, the system may determine the particular code exercised by the requests. This information may be stored with the request as a request signature. When building a test case, the system may add requests based on the number of requests with the same test signature already present in the test case set. For example, a developer may desire two request be included for each test signature. Alternatively or additionally, the developer may desire that two requests be included for each test signature but for some set of indicated test signatures, a different number be included. Further, in such a system, the request may be indexed in a repository by the test signatures.

In some implementations, if the user knows the behavior of the software is going to change between the authority or production software system and the candidate software system, the user may be able to exempt use cases based on the meta-data affected by the behavior change. In addition or alternatively, some implementations may index the requests based on other criteria such as candidate test differences, control test differences, latency differences, processing differences, amount or other measure of any difference between candidate test differences and the control test differences (e.g. an absolute value, a ratio, a percentage, etc.). As such, the additional or alternative indexes may be utilized to provide requests that reflect such criteria.

Figure 5:
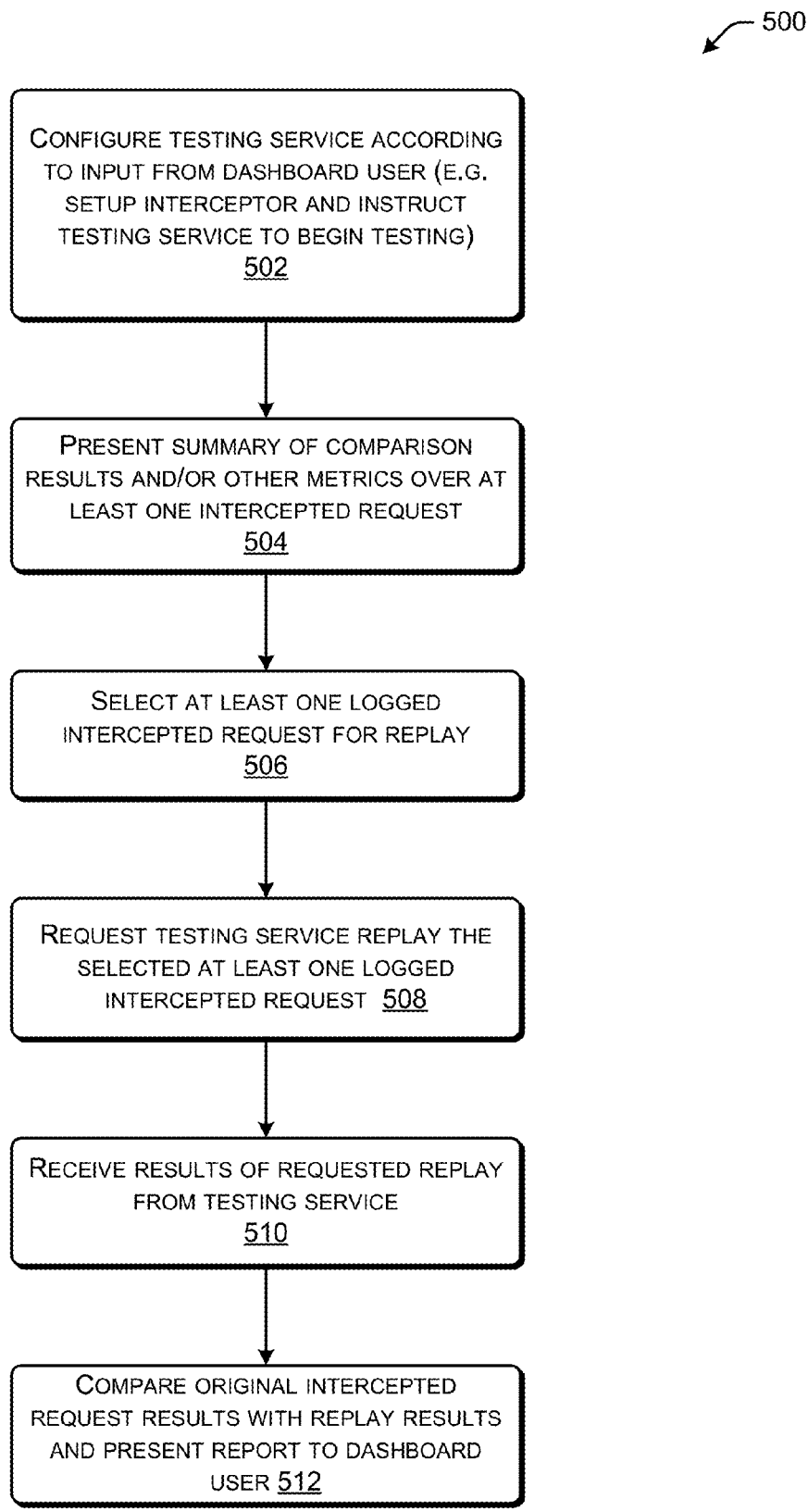
FIG. 5 is a flow diagram of an illustrative process to perform testing of an intercepted request to validate one or more software systems.

FIG. 5 is a flow diagram of an illustrative process 500 that provides for software testing of one or more software systems using intercepted requests as described above regarding FIGS. 1-3 and may be performed by the dashboard service 118. In particular, process 500 illustrates an example process flow showing the operations of the dashboard service 118, from initiating testing to using replay results to determine if a new candidate software system resolves unacceptable differences identified in a previous candidate software system (e.g., the candidate software system at the initiation of the process 500). It should be noted that there is no requirement of a new candidate software system. This is merely an example scenario used to aid in comprehension.

At 502, the dashboard service 118 configures the testing service 110 according to input from a dashboard user. Once the testing service 110 is configured, the dashboard service 118 instructs the testing service 110 to begin testing. Although, direct communication with the interceptor 112 by the dashboard service 118 is implied in this discussion, such is not always the case as the testing service 110 may handle the configuration and instruction of the interceptor 112 based on its own instructions from the dashboard service 118. Moreover, it should be noted that with regard to the control of the testing service 110 by the dashboard service 118, this is merely an example implementation. The dashboard service 118 is not required for the operation of the testing service 110 in all implementations. In other words, the testing service 110 may operate independently or exclusive of the dashboard service 118. For example, the testing service 110 may include logic or instructions to determine the configuration without input from the dashboard service 118. Alternatively, the testing service 110 may have an internal means by which users or other applications may configure its settings. In still further implementations, the testing service 110 and the dashboard service 118 of the testing service system may be merged into a single device or application; or the various parts, modules, or the operations performed by the testing service 110 and the dashboard service 118 may be reorganized amongst them. For example, the metrics module 210 may be a component of the dashboard service 118 rather than the testing service 110.

At 504, the dashboard service 118 presents the results of and/or a summary of the results of a comparison of a pair including a candidate response 134 and a corresponding authority response 136, aggregate information over a plurality of comparisons of candidate responses 134 and corresponding authority responses 136 and/or other metrics for at least one intercepted request 124. The dashboard service 118 may further provide built-in alarming for notifying dashboard users or other appropriate parties, such as the owners of the software system being tested, of deviation from expected results. Depending on the implementation, the presented information may omit information regarding differences that were determined to be unlikely to be meaningful, present such information separately, present the information at the same time but with visual distinction, and so on. Further, the user may be provided with a user interface option to adjust the treatment of such information (e.g., a "meaningfulness score" for inclusion, visual distinctions, etc.).

At 506, the dashboard service controller or user selects at least one logged intercepted request for replay. Depending on the users' intent, the dashboard service 118 may provide the user with options to select the fields of the response structure to make the comparison on as well as which fields to include in the request log report. For example, in some cases, the dashboard user knows that some fields will be changed due to a change in function or the fields may be randomly generated. In such a case, the user may wish to have one or more such fields excluded from the analysis (e.g., by not being analyzed or by continuing to analyze and store information about the field but excluding the field from reporting). Moreover, in some implementations, the dashboard service 118 may provide the user with an interface to select or exclude fields of the requests and/or responses to be tested as the requests are being replayed. For example, if, after initiating an extensive testing process, the user finds that a field or portion of the requests and/or responses to be tested is the subject of multiple differences in the reports of the ongoing testing and that the differences are due to the field or portion being randomly generated, the user may be provided with a control to ignore the field or portion in further reports. Such functionality may be useful where restarting the testing process based on additional exclusions is disadvantageous. Similar, possibly automated functionality, may be included in some implementations that operates to exclude differences determined to not be meaningful based on the comparison of the candidate test differences with the control test differences. Further, similar functionality may be provided to allow the user to select a field whose differences were previously hidden and indicate that in ongoing reports the differences for the field should be shown or reported (e.g., the user determines that the exclusion of the field from the report was accidental or in error).

At 508, the dashboard service 118 requests the testing service 110 replay the selected at least one logged intercepted request in the manner specified. At 510, the dashboard service 118 receives the results of the requested replay from the testing service 110. At 512, the dashboard service 118 compares the results for the corresponding intercepted response or prior candidate response from the candidate stack 114 with the results of the replay and presents a report to a dashboard user based thereon. For example, in a situation in which the intercepted requests that were selected for replay were intercepted requests corresponding to candidate responses 134 that differed unacceptably from the corresponding authority/production responses 136/124 and a "fix" has since been applied to the candidate software system of the candidate stack 114, the report regarding the replay presented to the user by the dashboard service 118 may indicate to what extent, if any, the unacceptable differences have been reduced.

Figure 6:
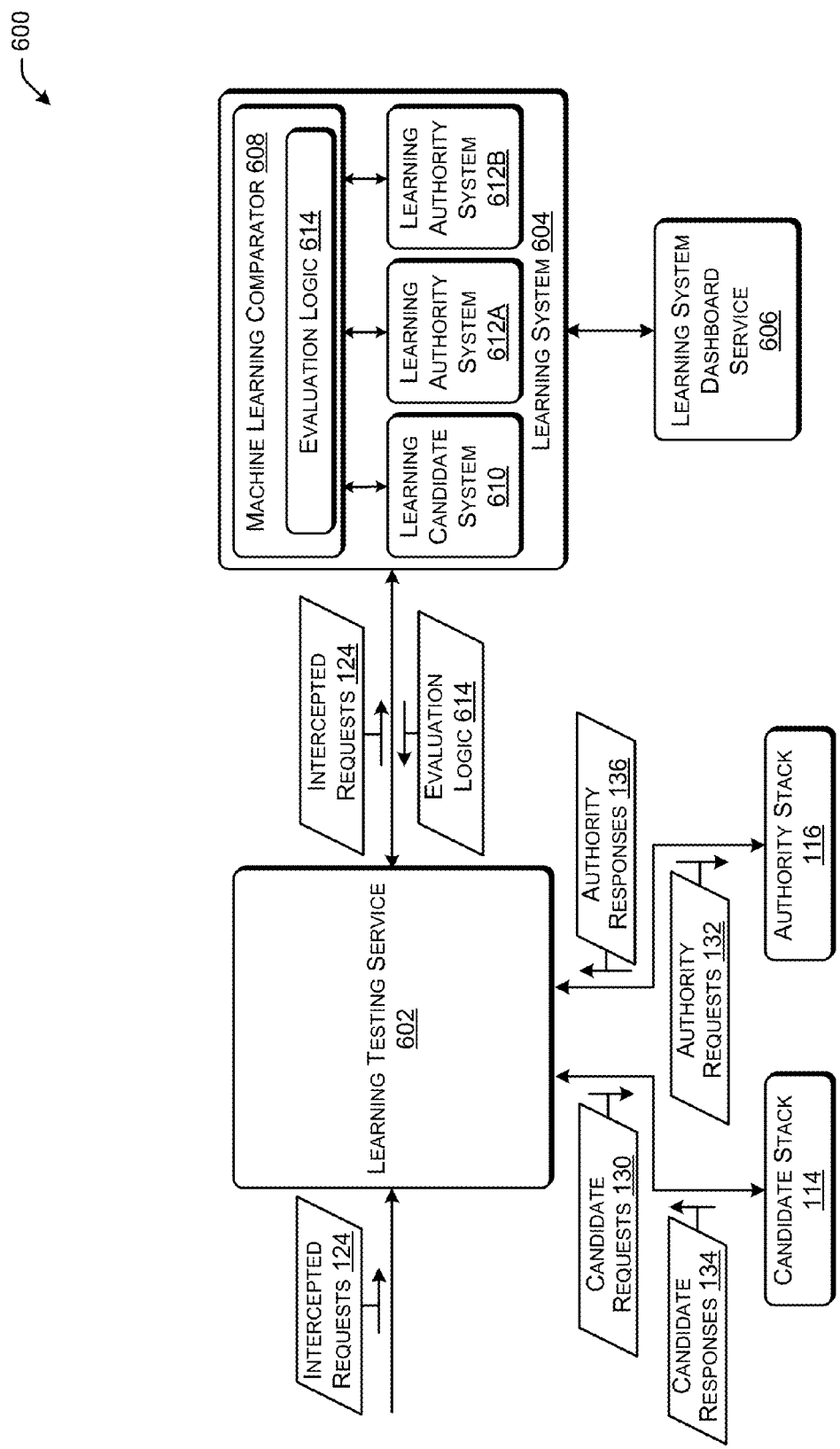
FIG. 6 is a schematic diagram of an illustrative environment that provides for a learning testing service.

FIG. 6 is a schematic diagram of an illustrative environment 600 that provides for the use of a learning testing service system including a learning testing service 602, a candidate stack 114, an authority stack 116, learning system 604 and a learning system dashboard service. The learning system 604 includes a machine learning comparator 608, a learning candidate system 610 and a plurality of learning authority systems 612A and 612B. Specifically, a learning testing service system is another implementation of the testing service system 110 discussed above regarding FIG. 1. In some implementations, such as that illustrated in FIG. 6, the testing service may utilize machine learning to develop logic to evaluate candidate test difference (e.g. whether the differences are meaningful differences). At a conceptual level, in the implementation illustrated in FIG. 6, the learning testing service 602 utilizes machine learning to train evaluation logic 614 to evaluate candidate test differences without performing a control test for each candidate request.

Initially, the learning test system 602 receives intercepted requests 124 and submits the intercepted requests 124 to the learning system 604. The machine learning comparator 608 of the learning system 604 submits the intercepted requests 124 to the learning candidate system 610 and to the learning authority systems 612A and 612B. The learning candidate system 610 and the learning authority systems 612A and 612B process the intercepted requests 124 and return responses to the machine learning comparator 608 based on their respective software systems.

The machine learning comparator 608 performs candidate tests and control tests using responses from the learning candidate system 610 and learning authority systems 612A and 612B. The machine learning comparator 608 may cause the evaluation logic 614 to process the candidate test differences based on its current state to evaluate the candidate test differences (e.g., whether each difference is meaningful).

The results of the evaluation by the evaluation logic 614, the candidate test, the control test, and other information may be provided to a user of the learning system dashboard service 606 to obtain feedback regarding the evaluation of the differences of the candidate test (e.g., whether the evaluation(s) of the candidate test differences as meaningful or not meaningful were correct). The feedback may be returned to the learning system 604.

The machine learning comparator 608 may utilize the information obtained from the user and the results of the candidate test and the control test as training data to adapt the evaluation logic 614 (with the goal of improving the accuracy of the evaluation of the candidate test differences).

As illustrated in FIG. 6, the learning system 604 may output the trained evaluation logic 614 to the learning testing system 602. Depending on the implementation, the evaluation logic 614 may be continuously updated and output by the learning system 604 to the learning testing service 602 for use in live operation, generated or updated and output to the learning testing system 602 at initialization and/or when manually instructed to perform an update, updated on a periodic basis, or any other generation and update schedule.

In some implementations, upon receiving the evaluation logic 614, the learning testing service 602 may operate in a similar manner to that discussed above with regard to FIG. 1 by issuing candidate requests 130 and authority requests 132 to a candidate stack 114 and an authority stack 116. However, in the implementation illustrated in FIG. 6, the learning testing service 602 may not issue a plurality of authority requests 132 for each candidate request 130 (i.e., as was performed in FIG. 1). Instead, in some implementations according to FIG. 6, the learning testing service 602 issues a single authority request 132 for each candidate request 130 and does not perform a control test. Instead, the candidate test differences may be evaluated by the learning testing service 602 using the evaluation logic 614 to determine whether the candidate test differences are meaningful.

Having determined the meaningfulness of the candidate test differences, the learning testing service 602 of FIG. 6 may then continue the process in the same manner as described above with regard to FIGS. 1-5.

Figure 7:
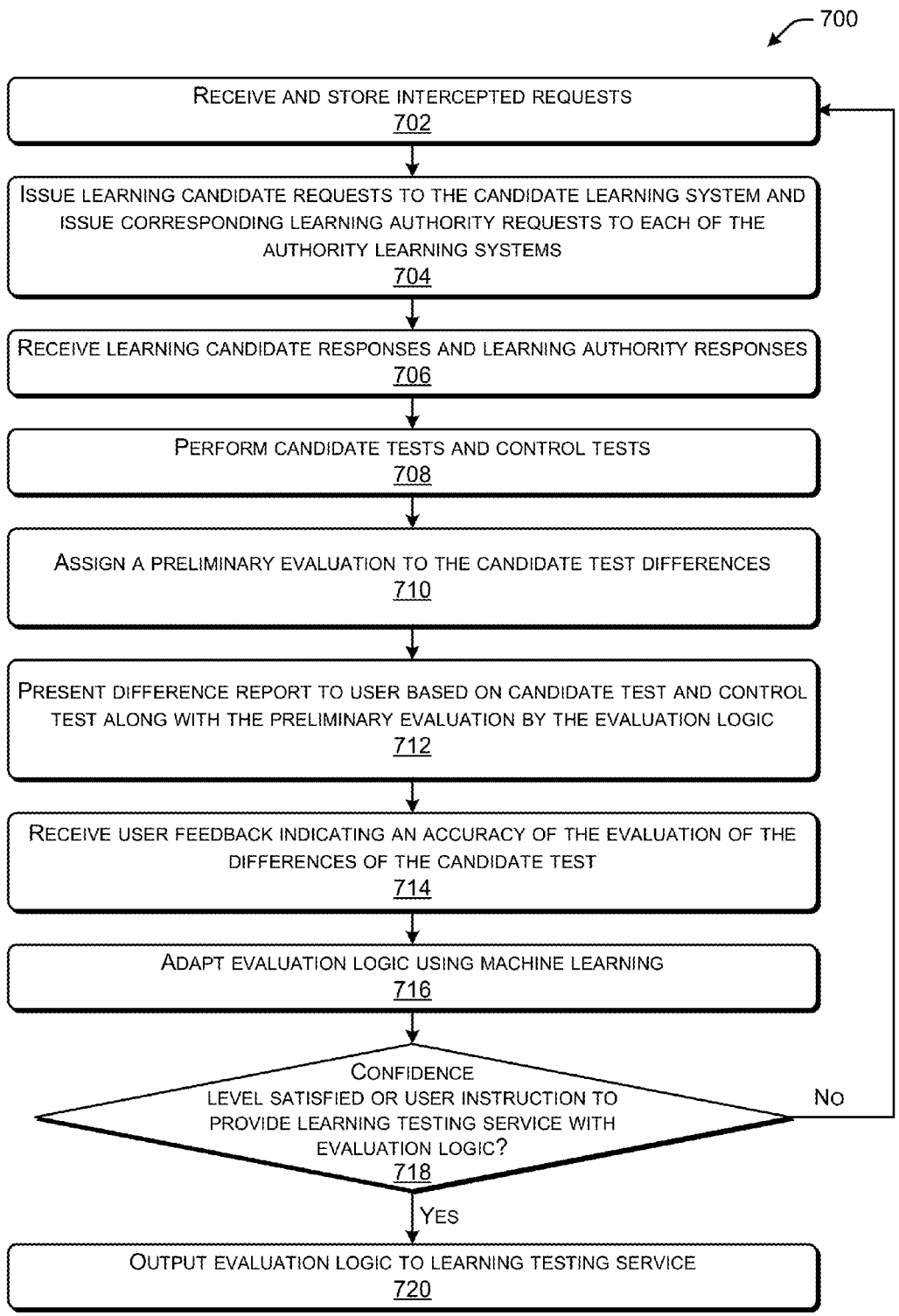
FIG. 7 is a flow diagram of an illustrative process to develop evaluation logic for testing of a request in a learning testing service.

FIG. 7 is a flow diagram of an illustrative process 700 that provides for development of evaluation logic 614 for evaluating the candidate test differences as described above with regard to FIG. 6 and may be performed by the learning system 604. In particular, process 700 illustrates an example process flow showing the operations of the learning system 604, from receiving the intercepted requests 124 to providing the evaluation logic 614 to the learning testing service 602.

At 702, the learning system 604 receives and stores the intercepted requests 124 in a memory for processing. At 704, the machine learning comparator 608 of the learning system 604 issues candidate and authority requests to the learning candidate system 610 and the learning authority systems 612A and 612B. At 706, the machine learning comparator 608 receives the learning candidate responses and learning authority responses from the learning candidate system 610 and the learning authority systems 612A and 612B.

At 708, the machine learning comparator 608 may perform candidate tests and control tests for the received responses. At 710, the machine learning comparator 608 may cause the evaluation logic 614 to assign a preliminary evaluation to the candidate test differences based on the current iteration of the evaluation logic 614. At 712, the learning system 604 may present a difference report to a user of the learning system dashboard service 606 based on the candidate test and the control test along with the preliminary evaluations by the current iteration of the evaluation logic 614.

At 714, the learning system 604 may receive user feedback regarding the accuracy of the preliminary evaluations of the differences by the evaluation logic 614. At 716, the candidate test results, control test results, the preliminary evaluations and the user feedback may be input as training data to adapt the evaluation logic 614 using machine learning.

At 718, the learning system 604 may determine if the evaluation logic 614 has reached a threshold confidence level in the evaluation of candidate test differences or if the learning system dashboard user has issued an instruction to provide the learning testing service 602 with the evaluation logic 614. If not, the process may return to 702 and repeat. Otherwise, the process may continue to 720 and the learning system 604 may output the current iteration of the evaluation logic 614 to the learning testing service 602. As previously mentioned, if the evaluation logic 614 is output to the learning testing service 602, the learning system 604 may enter an inactive state as illustrated or the process may return to 702 and continue iterations of the process of FIG. 7.

Figure 8:
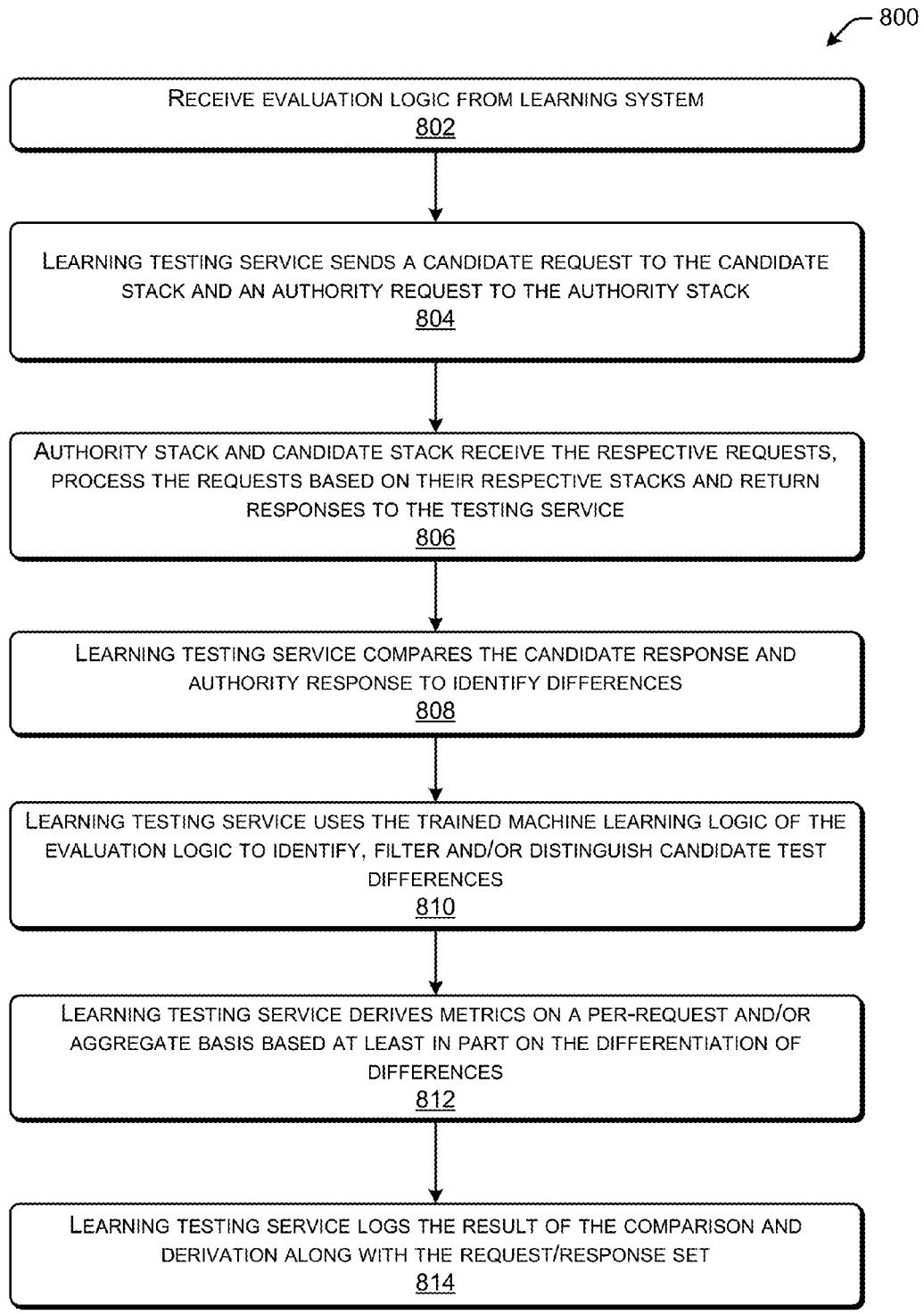
FIG. 8 is a flow diagram of an illustrative process to perform testing of an intercepted request to validate one or more software systems that include the evaluation logic.

FIG. 8 is a flow diagram of an illustrative process 800 that provides for software testing of one or more software systems using intercepted requests as described above regarding FIG. 6 and may be performed by the learning testing service 602. In particular, process 800 illustrates an example process flow showing the operations of the learning testing service 602 using the evaluation logic 614 provided by the learning system 604.

At 802, the learning testing service 602 may receive the evaluation logic from the learning system 604. At 804, the learning testing service 602 may send a candidate request 130 to the candidate stack 114 and an authority request 132 to the authority stack 116 (i.e., possibly one authority request 132 per candidate request 130 rather than a plurality of authority requests 132 discussed with regard to FIGS. 1-5). At 806, authority stack 114 and candidate stack 116 may receive the respective requests, process the requests based on their respective stacks and return responses to the testing service.

At 808, the learning testing service 602 may perform a candidate test using the candidate response 134 and authority response 136 to identify any candidate test differences. As previously mentioned, in an implementation according to FIGS. 6-8, the learning testing service 602 may not perform a control test. Rather, at 810, the learning testing service 602 utilizes the evaluation logic 614 to identify, filter and/or distinguish candidate test differences found in the candidate test (e.g., evaluate the meaningfulness of the differences).

At 810, the learning testing service 602 derives metrics on a per-request and/or aggregate basis based at least in part on the evaluation of the candidate test differences. As discussed above, in some implementations, different treatment may be applied to candidate test differences evaluated to be unlikely to be meaningful or such differences may be omitted from reports altogether. At 812, the learning testing service 602 logs the result of the comparison and derivation along with the request/response set. Thereafter, the process of FIG. 8 may repeat from 804 with respect to a new intercepted request 124.

While FIG. 8 is discussed above does not include the learning testing service 602 issuing a second authority request to obtain a second authority response to perform a control test once the evaluation logic 614 is being used by the learning testing service 602, this is not limiting. In some implementations of the learning testing service 602, control tests may be performed by the learning testing service 602 periodically, continuously, or based on some schedule or trigger. These and other variations would be apparent to one of ordinary skill in the art in view of this disclosure.

Figure 9:
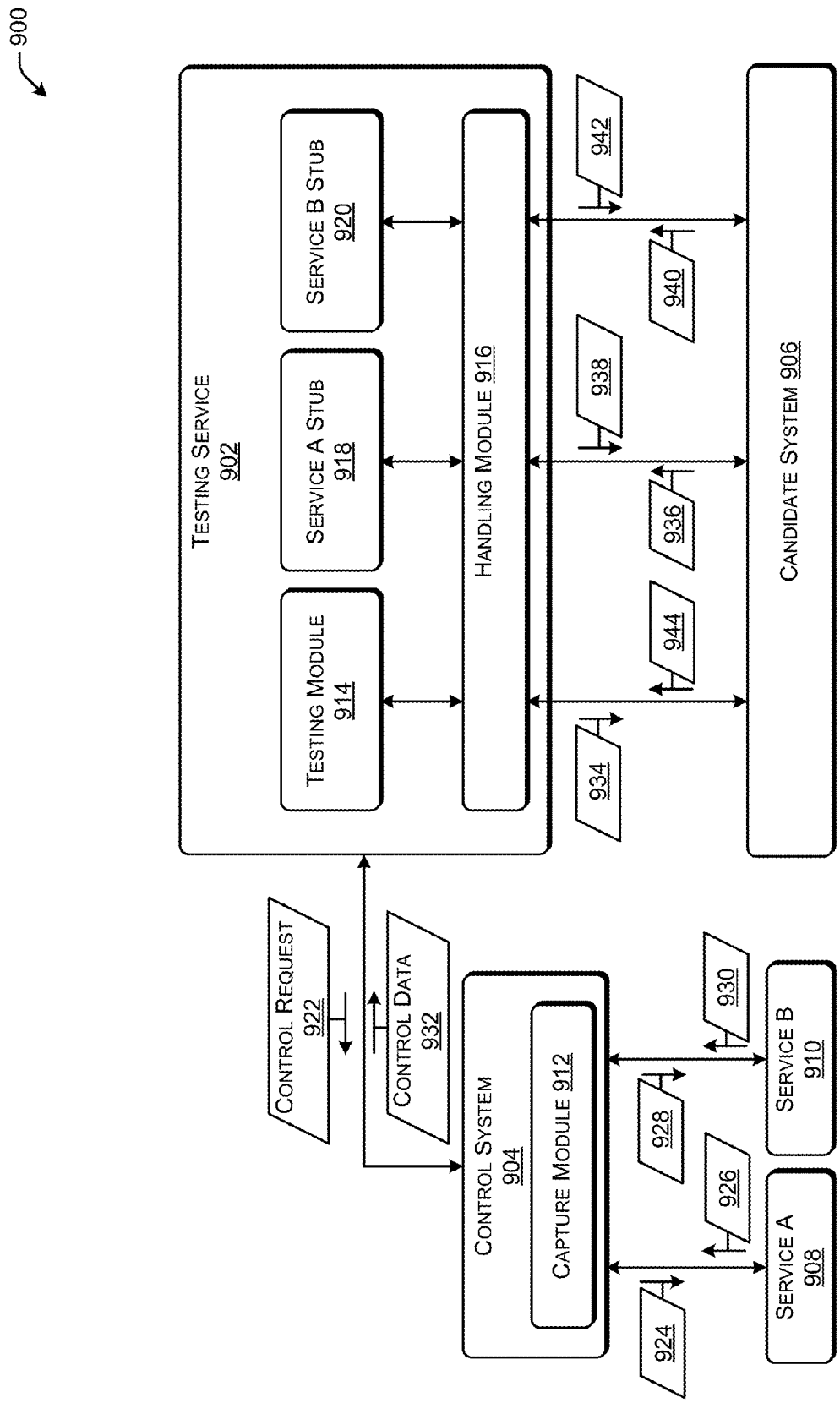
FIG. 9 is a schematic diagram of an illustrative environment that provides software testing of one or more software systems with dependencies.

FIG. 9 illustrates a schematic diagram of an illustrative environment 900 that provides another example application of the techniques disclosed herein. The system illustrated in FIG. 9 includes a testing service 902, a control system 904 and a candidate system 906. The system of FIG. 9 may provide for the evaluation of a candidate software system for requests that have dependence on other services through the use of stubbing. In this context, a dependence on other service(s) for a candidate request may mean that, to generate the candidate response, the candidate software system uses information provided to the candidate software system in one or more intermediate response(s) to one or more intermediate request(s) to the other service(s) from the candidate software system. In the example illustrated in FIG. 9, the control software system of the control system 904 and the candidate software system of the candidate system 906 have dependencies on service A 908 and service B 910. The capture module 912 of the control system operates to capture the intermediate communications between the control system 904 and the service A 908 and the service B 910. The captured intermediate communications may be provided to the testing service 902 along with the control response.

In FIG. 9, stubbing is utilized with respect to the candidate software system in processing the candidate request. The testing service 902 includes a testing module 914, a handling module 916, a service A stub 918 and a service B stub 920. Stubbing is generally the use of programs or services, also called "test stubs," that simulate the behaviors of other software components (or modules) that a software system undergoing tests depends on. Typically, the operations of the software components (or modules) impersonated by the stubs are not performed by the stubs. Rather, the stubs may be preprogrammed with the "correct response" to a known correct request. In FIG. 9, the stub functions are performed by the service A stub 918 and the service B stub 920. In general, the testing module 914 handles most of the previously discussed functions of a testing service (with respect to FIGS. 1-8). The handling module 916 routes intermediate communications between the candidate system 906 and the testing module 914, the service A stub 918 and the service B stub 920. A more detailed discussion of an example set of operations of the system of FIG. 9 is provided below.

In operation, the testing module 914 of the testing service 902 operates to issue a control request 922 to the control system 904. During the processing of the control request 922 by the control system 904, the control system 904 issues a first intermediate control request 924 to the service A 908. The service A 908 responds with a first intermediate control response 926. Upon receiving the first intermediate control response 926, the control system 904 continues processing the control request 922 and subsequently issues a second intermediate control request 928 to the service B 910. The service B 910 processes the second intermediate request 928 and responds to the control system 904 with a second intermediate control response 930. Upon receiving the second intermediate control response 930 from the service B 910, the control system 904 completes the processing of the control request 922 to generate a control response. As the foregoing interactions occur, the capture module 912 captures the first intermediate control request 924, the first intermediate control response 926, the second intermediate control request 928 and the second intermediate control response 930. The communications 924-930 and the control response are sent to the testing service 902 as the control data 932.

In some implementations, a plurality of control requests 922 are issued for each request being tested. The testing module 914 of the testing service 902 may utilize the control data 932 for a first control request and a second control request to perform a control test on, and determine control differences for, the communications 924-930 and the control responses.

The control differences and control data 932 may be provided to the handling module 916 to assist the testing service 902 in processing the candidate request. For example, based on the control data 932, the testing module 914 may operate to provide the handling module 916 with information about the expected communications for the candidate request corresponding to the control request 922 (e.g., sequence and form of the intermediate candidate communications). For example, the handling module 916 may maintain a list of expected intermediate communications and, as the communications are received, mark the corresponding list item as received. Further, the handling module 916 may use the control differences for the intermediate control communications to eliminate fields of the intermediate candidate communications from consideration or otherwise assist the handling module 916 in determining the expected communication to which each received intermediate candidate communication corresponds.

Having received and processed the control data 932, the testing module 912 may send a candidate request 934 to the candidate system 906. During the processing of the candidate request 934 by the candidate system 906, the candidate system 906 issues a first intermediate candidate request 936 to the testing service 902. The handling module 916 for the testing service 902 may utilize, for example, destination information as well as information derived in the control testing to recognize that the first intermediate candidate request 936 corresponds to the first intermediate control request 924 to provide the first intermediate candidate request 936 to the service A stub 918. Upon receiving the first intermediate candidate request 934, the service A stub 918 may respond with a first intermediate candidate response 938 which is forwarded to the candidate system 906 by the handling module 916. Upon receiving the first intermediate candidate response 938, the candidate system 906 continues processing the candidate request 934 and subsequently issues a second intermediate candidate request 940 to the testing service 902. The handling module 916 and the service B stub 920 may operate in a similar manner to that discussed above with regard to the first intermediate candidate request 934 to respond to with the second intermediate candidate response 942. Upon receiving the second intermediate candidate response 942, the candidate system 906 completes the processing of the candidate request 934 to generate a candidate response 944. As the interactions with the candidate system 906 occur, the handling module 916 may operate as discussed above to mark items of a list of expected intermediate communications as received. This may assist the handling module 916 in identifying the received intermediate communications and in determining that the expected interactions are complete.

Once the processing of the candidate request 934 is complete, the intermediate candidate communications 936-944 and the candidate response 944 may subjected to candidate testing using control data 932 for at least one control request 922 to generate determine candidate differences. Then, the candidate test differences may be evaluated for meaningfulness based on control differences. As such, meaningful differences may be ascertained for both the candidate response 944 as well as for the intermediate communications 936-942. Thus, implementations such as that illustrated in FIG. 9 may not only determine variances or differences in intermediate communications by the candidate system 906, such implementation may also determine which variations or differences are meaningful.

In some implementations, the testing service 902 may perform additional or special operations when testing the intermediate communications. For example, when the stubs do not actually perform the functions of the impersonated services and instead reply with preprogramed "correct" responses based on, for example, order of reception, it is possible for the testing service 902 to overlook or otherwise ignore variations that are meaningful or erroneous in the intermediate candidate requests from the candidate system 906. For example, if the first intermediate candidate request 936 generated by the candidate system 906 has errors and the service A stub 918 responds with the correct first intermediate candidate response 938 corresponding to a correct first intermediate candidate request 936, the testing of the candidate system 906 becomes unreliable and inaccurate because any processing performed by the candidate system 906 based on such a correct first intermediate candidate response 938 may suppress the error. For example, without the use of stubbing, when the service A 908 processes the erroneous first intermediate candidate request 936, the error may propagate through the intermediate communications and into the candidate response 944. As such, the error would be detectable by candidate testing. For this reason, in some implementations, it may be desirable to perform candidate testing and control testing on the intermediate candidate requests as the intermediate candidate requests are received from the candidate system 906 by the testing service 902. In this way, errors may be determined as the errors occur and, depending on the intent of the user of the testing service 902, the errors may be noted and suppressed for ongoing operations or the erroneous intermediate candidate request may be provided to the actual service, for example service A 908, such that the error maybe propagated to test the effect of the error on the generating of the candidate response 944.

While this disclosure provides various example implementations, as described and as illustrated in the drawings. However, this disclosure is not limited to the implementations described and illustrated herein, but can extend to other implementations, as would be known or as would become known to those skilled in the art. For example, in some implementations, the system may obtain a plurality of candidate responses for the intercepted requests in addition to or as an alternative to the plurality of control responses and may perform a variation of control testing using the plurality of candidate responses in addition to or as an alternative to the previously described control testing of the plurality of control responses. Moreover, in some implementations, both control response may not be obtained for every candidate request. Rather, in some operations, the second control request may be issued after differences are detected in the candidate testing.

Further, while the implementations illustrated and discussed herein are provided in the context of a testing service utilizing intercepted requests. The techniques and systems according to this disclosure are not so limited. In other words, the techniques and systems described herein may be applied to a variety of contexts. For example, rather than being part of a system that intercepts client requests, some implementations may be provided with test case sets that are artificial (e.g. developer generated) or otherwise not collected or intercepted by a system of which the testing service is a part. These and many other variations would be apparent to one of ordinary skill in the art in view of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed:

1. A computer-implemented method comprising:
under control of one or more processors configured with executable instructions,
requesting a candidate software system to process a candidate request that is based at least in part on an intercepted request, wherein the candidate software system is undergoing validation;
requesting a control software system to process a plurality of control requests that are based at least in part on the intercepted request, wherein the control software system is used for validating the candidate software system;
receiving, based at least in part on the candidate request, a candidate response from the candidate software system and an intermediate candidate communication issued by the candidate software system;
receiving, based at least in part on the plurality of control requests, a plurality of control responses from the control software system and a plurality of intermediate control communications issued by the control software system;
comparing the intermediate candidate communication to at least a first intermediate control communication of the plurality of intermediate control communications to obtain one or more intermediate candidate test differences;
comparing at least a second intermediate control communication of the plurality of intermediate control communications to at least one of the first intermediate control communication or a third intermediate control communication of the plurality of intermediate control communications to obtain one or more intermediate control test differences; and
analyzing the one or more intermediate candidate test differences based on the one or more intermediate control test differences.

2. The computer-implemented method as recited in claim 1, wherein the one or more intermediate candidate test differences include at least one of content differences, timing differences, or resource usage differences between the candidate software system and the control software system.

3. The computer-implemented method as recited in claim 1, wherein the analyzing includes evaluating whether any of the one or more intermediate candidate test differences are due to differences between the candidate software system and the control software system.

4. The computer-implemented method as recited in claim 3, further comprising:
displaying information associated with the evaluating whether any of the one or more intermediate candidate test differences are due to differences between the candidate software system and the control software system.

5. The computer-implemented method as recited in claim 1, further comprising:
determining, based at least partially on the candidate request, one or more use-cases of the candidate software system exercised by the candidate request or a code coverage of the candidate software system of the candidate request;
determining if at least one of the one or more use-cases of the candidate software system exercised by the candidate request is not exercised by one or more test case requests of a test case or if the code coverage of the candidate software system of the candidate request includes coverage that is not included in a code coverage of the one or more test case requests; and
adding the candidate request to the test case if the one or more use-cases of the candidate software system exercised by the candidate request is not exercised by the one or more test case requests of the test case or if the code coverage of the candidate software system of the candidate request includes coverage not included in the code coverage of the one or more test case requests.

6. The computer-implemented method as recited in claim 1, further comprising:
determining one or more use-cases of the candidate software system exercised by the candidate request or determining a code coverage of the candidate software system of the candidate request; and
indexing the candidate request in a request repository based at least in part on a test signature determined based on the one or more use-cases of the candidate software system exercised by the candidate request or the code coverage of the candidate software system of the candidate request.

7. The computer-implemented method as recited in claim 1, further comprising:
developing, based at least in part on the one or more intermediate candidate test differences and the one or more intermediate control test differences, an evaluation logic for evaluating candidate test differences.

8. The computer-implemented method as recited in claim 7, wherein the developing the evaluation logic comprises:
generating an evaluation of whether the one or more intermediate candidate test differences are due to differences between the candidate software system and the control software system, wherein the generating is based at least in part on the analyzing the one or more intermediate candidate test differences based on the one or more intermediate control test differences.

9. The computer-implemented method as recited in claim 8, wherein the analyzing is based on a current iteration of the evaluation logic.

10. The computer-implemented method as recited in claim 9, wherein the developing the evaluation logic comprises:
modifying the current iteration of the evaluation logic based on feedback related to the evaluation of whether the one or more intermediate candidate test differences are due to differences between the candidate software system and the control software system, the modifying being at least in part performed by a machine learning system.

11. The computer-implemented method as recited in claim 1, wherein the candidate software system is different than the control software system and wherein at least one of:
the candidate software system comprises a different interface from the control software system;
the candidate software system comprises a different number of services or components from the control software system;
the candidate software system comprises a different framework or a different protocol from the control software system; or
the candidate software system operates in a different operating system or environment from the control software system.

12. A testing system, comprising:
at least one computing device including a hardware processor configured to implement an interceptor service and a testing service,
wherein the interceptor service is configured to intercept at least one request to a production system and provide the at least one request to the testing service; and
wherein the testing service is configured to process the at least one request by:
causing at least one candidate request to be processed by a candidate software system that is undergoing validation;
causing a plurality of control requests to be processed by one or more control software systems that are used for validating the candidate software system, wherein the at least one candidate request and the plurality of control requests are based at least in part on the at least one request;
receiving, based at least in part on to the at least one candidate request, at least one candidate response from the candidate software system and at least one intermediate candidate communication issued by the candidate software system;
receiving, based at least in part on to the plurality of control requests, a plurality of control responses from the one or more control software systems and a plurality of intermediate control communications issued by the one or more control software systems;
comparing the at least one intermediate candidate communication to at least a first intermediate control communication of the plurality of intermediate control communications to obtain one or more intermediate candidate test differences;
comparing at least a second intermediate control communication of the plurality of intermediate control communications to at least one of the first intermediate control communication or a third intermediate control communication of the plurality of intermediate control communications to obtain one or more intermediate control test differences; and
analyzing the one or more intermediate candidate test differences based on the one or more intermediate control test differences.

13. The testing system as recited in claim 12, wherein the one or more intermediate candidate test differences include latency differences between the candidate software system and the one or more control software systems that generated the first control response.

14. The testing system as recited in claim 12, wherein the comparing the at least one intermediate candidate communication to at least the first intermediate control communication includes identifying differences specified as being unacceptable to the operation of the candidate software system.

15. The testing system as recited in claim 14, wherein the testing service replays the at least one request to a modified candidate software system and determines if a particular intermediate candidate test difference specified as being unacceptable to operation of the candidate software system occurs again in association with at least one replay candidate response generated by the modified candidate software system.

16. The testing system as recited in claim 12, wherein a production software system modifies system data of the production system and the testing service causes the at least one request to be processed by the candidate software system such that system data of the production system is not modified.

17. One or more non-transitory computer-readable storage media storing computer-executable instructions executable in at least one computing device, comprising:
instructions for issuing a test request as a plurality of control requests to a control software system to obtain a plurality of corresponding control responses and a plurality of corresponding sets of intermediate control communications with at least one other software system, wherein the control software system:
issues at least one intermediate control communication of the plurality of corresponding sets of intermediate control communications to the other software system, and
receives a response to the at least one intermediate control communication of the plurality of corresponding sets of intermediate control communications upon which a corresponding control response of the plurality of corresponding control responses is based at least in part;
instructions for issuing the test request as a candidate request to a candidate software system to obtain a corresponding candidate response and a corresponding set of intermediate candidate communications, wherein the candidate software system:
issues at least one intermediate candidate communication of the corresponding set of intermediate candidate communications, and
receives a response to the at least one intermediate candidate communication upon which the corresponding candidate response is based at least in part, wherein the control software system is being used for validating the candidate software system;
instructions for comparing at least part of the corresponding set of intermediate candidate communications to at least part of a first set of intermediate control communications corresponding to a first control response of the plurality of corresponding control responses to obtain one or more intermediate candidate test differences;
instructions for comparing at least part of a second set of intermediate control communications corresponding to a second control response of the plurality of corresponding control responses to at least part of the first set of intermediate control communications or at least part of a third set of intermediate control communications corresponding to a third control response of the plurality of corresponding control responses to obtain one or more intermediate control test differences; and
instructions for analyzing the one or more intermediate candidate test differences based at least in part on the one or more intermediate control test differences.

18. The one or more non-transitory computer-readable media as recited in claim 17, wherein the response to the at least one intermediate candidate communication, upon which the corresponding candidate response is based at least in part, is received from at least one stub acting in place of the other software system.

19. The one or more non-transitory computer-readable media as recited in claim 18, wherein the one or more intermediate control test differences are obtained prior to the issuing of the test request as the candidate request.

20. The one or more non-transitory computer-readable media as recited in claim 19, wherein the intermediate candidate test differences are obtained for an intermediate candidate request of the corresponding set of intermediate candidate communications and evaluated prior to the stub issuing a response to the intermediate candidate request.

* * * * *